Figure 3:
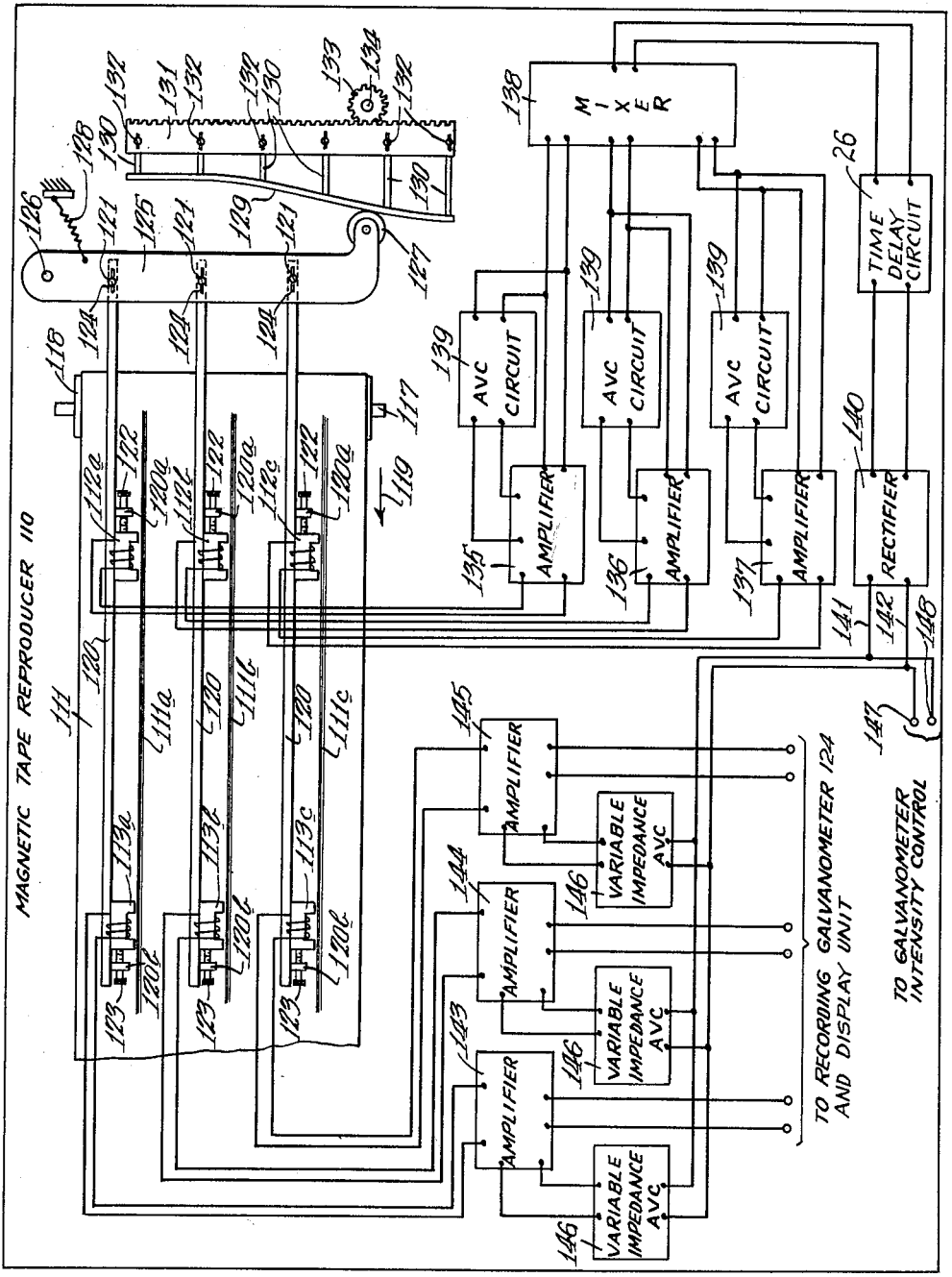

March 2, 1965   J. E. HAWKINS   3,172,077
REPRODUCING AND TRANSLATING APPARATUS
Filed April 12, 1955   7 Sheets-Sheet 1
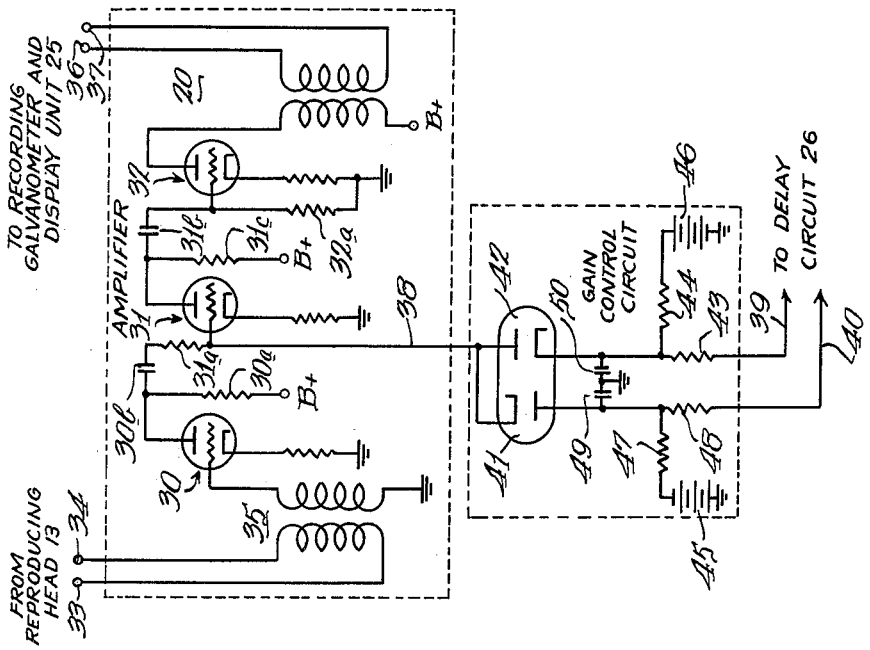
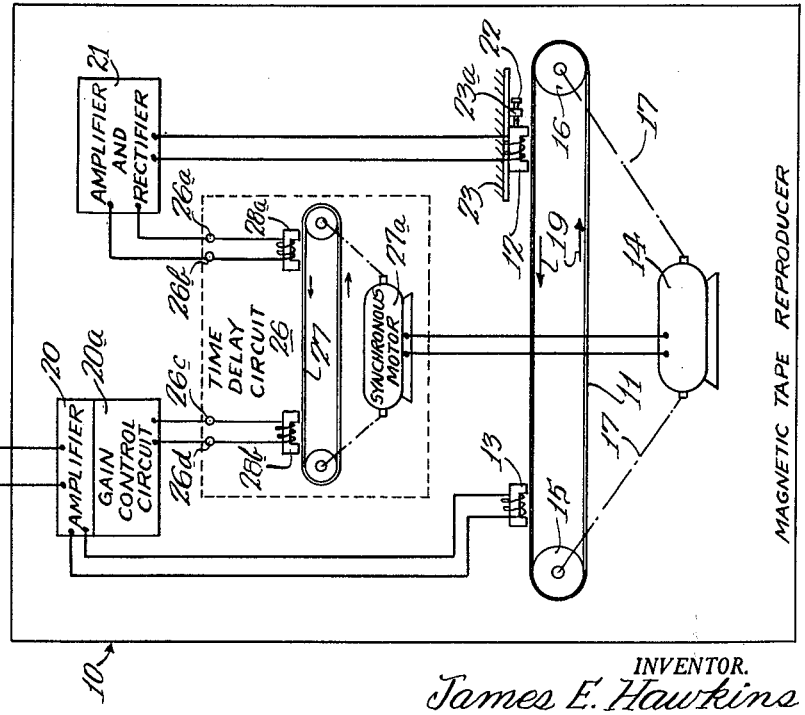
INVENTOR.
James E. Hawkins
BY
Mason, Kolehmainen, Rathburn & Wyss
Attys.

March 2, 1965    J. E. HAWKINS    3,172,077
REPRODUCING AND TRANSLATING APPARATUS
Filed April 12, 1955    7 Sheets-Sheet 2

INVENTOR.
James E. Hawkins
BY
Mason, Kolehmainen, Rathburn & Wyss
Attys.

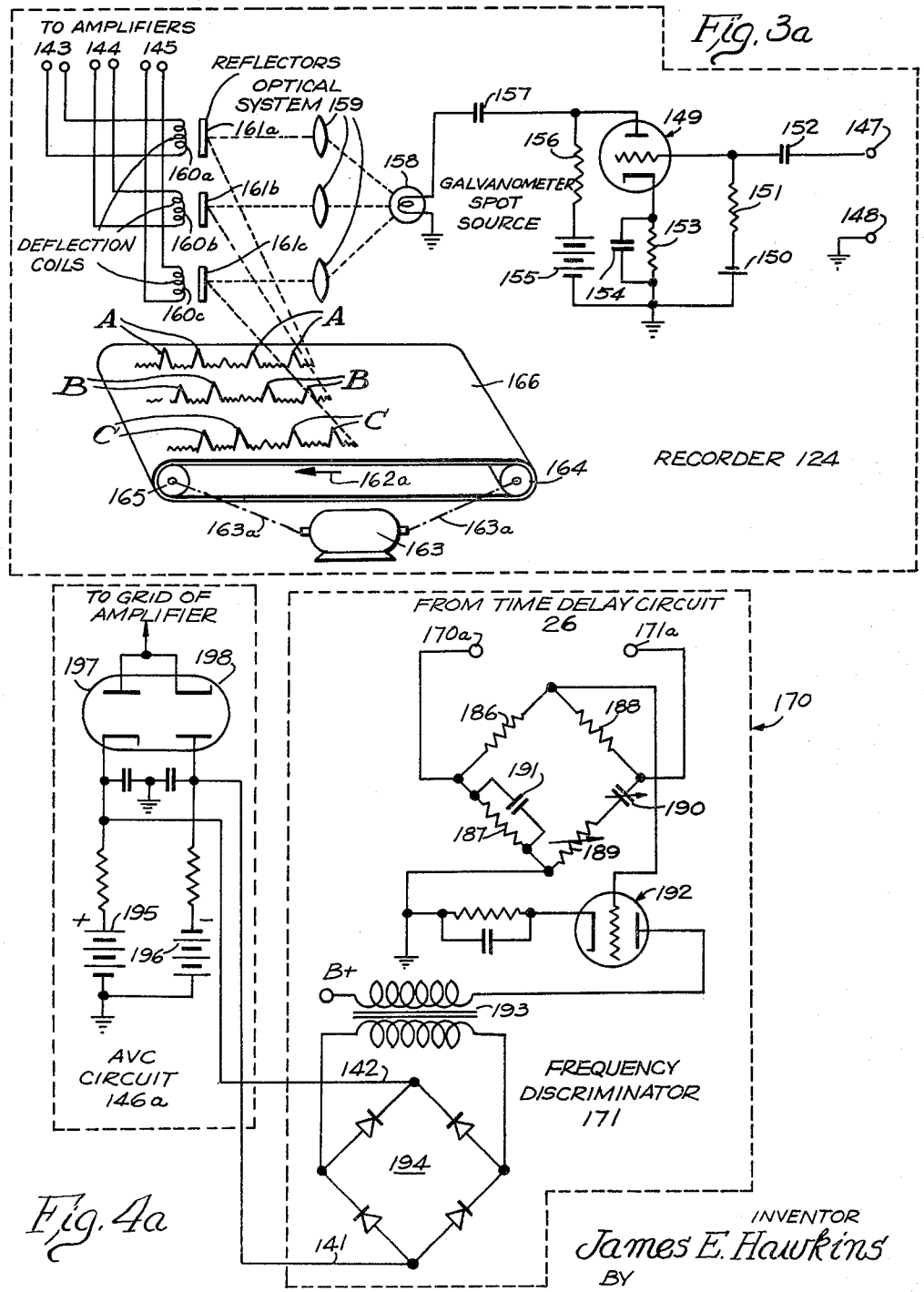

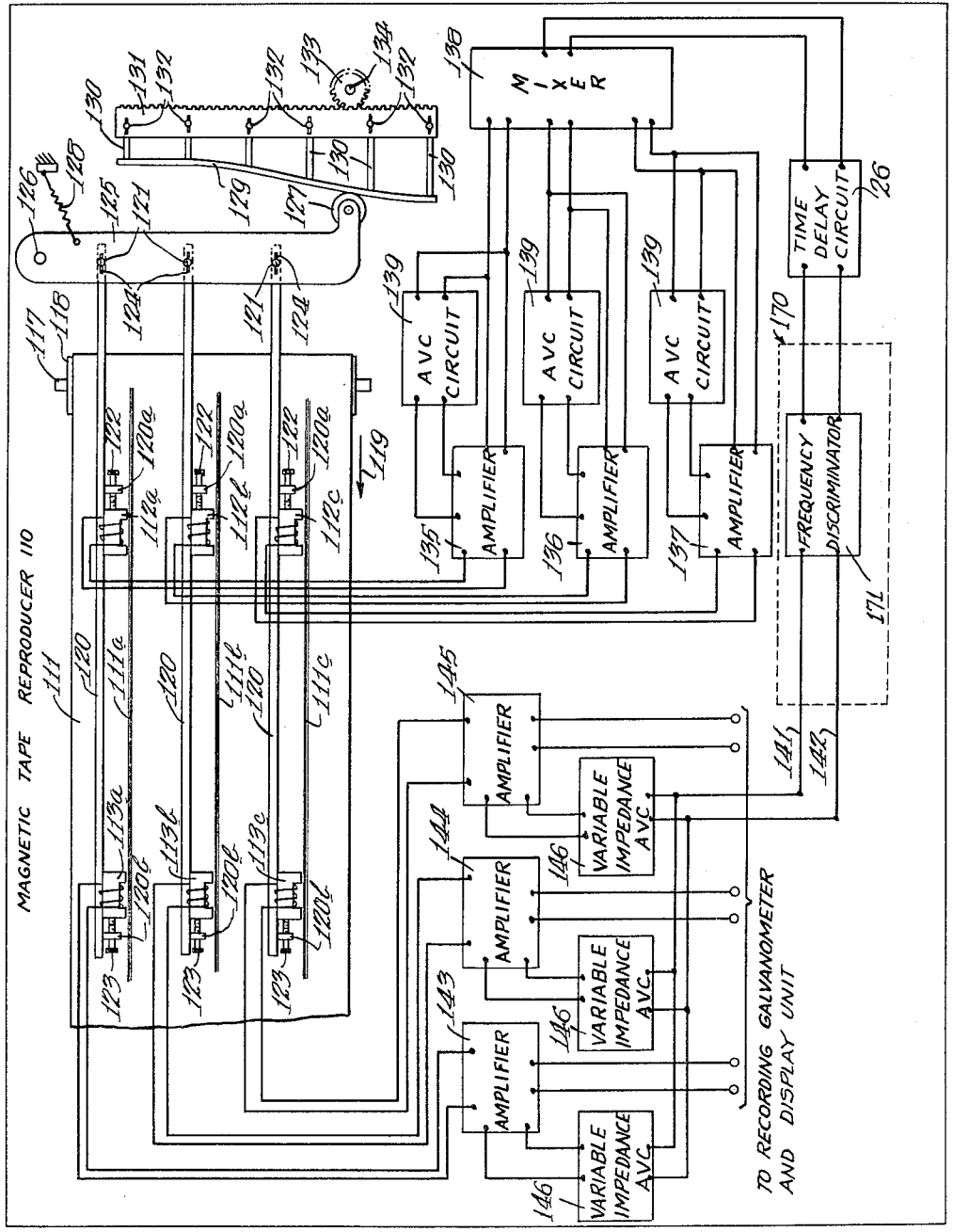

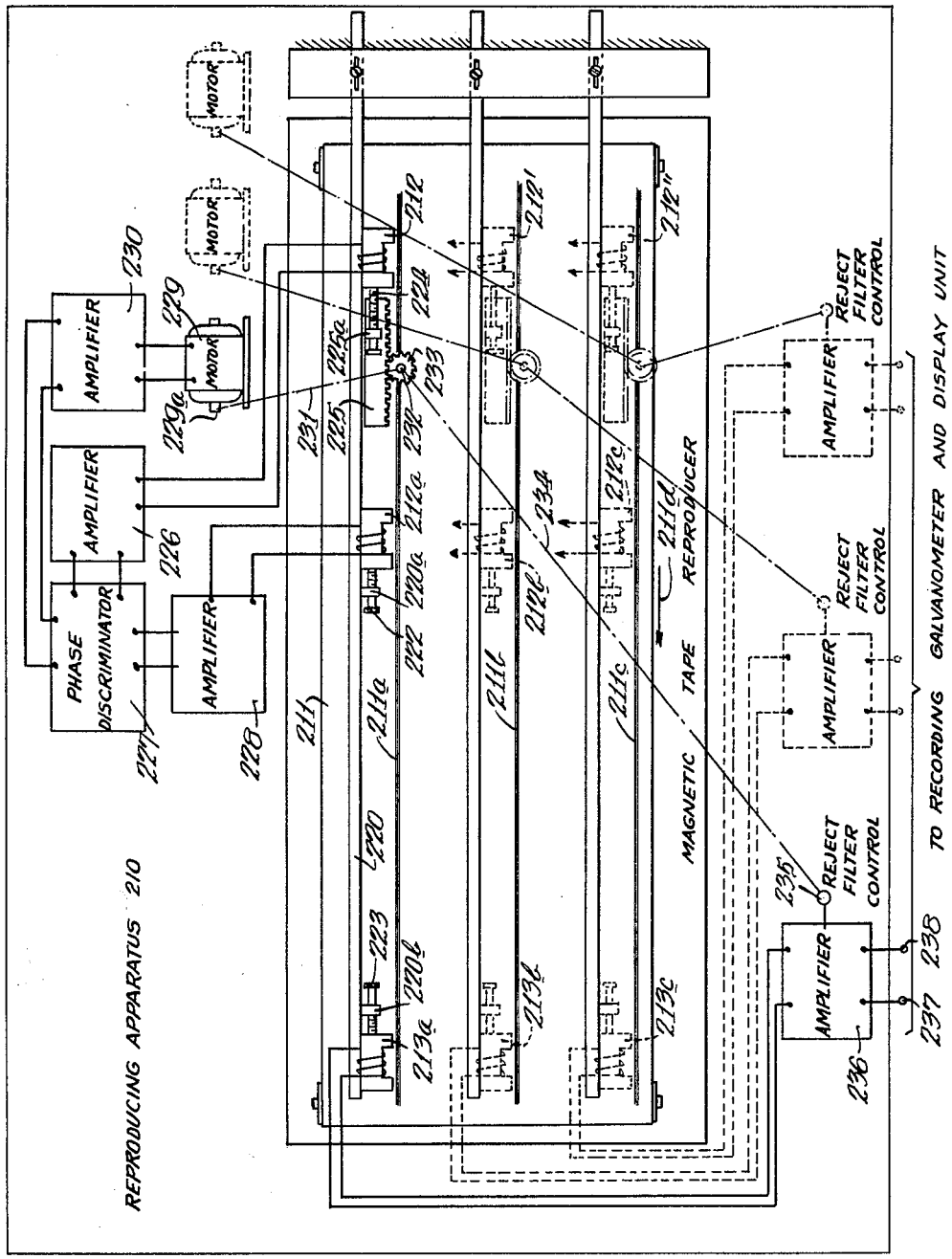

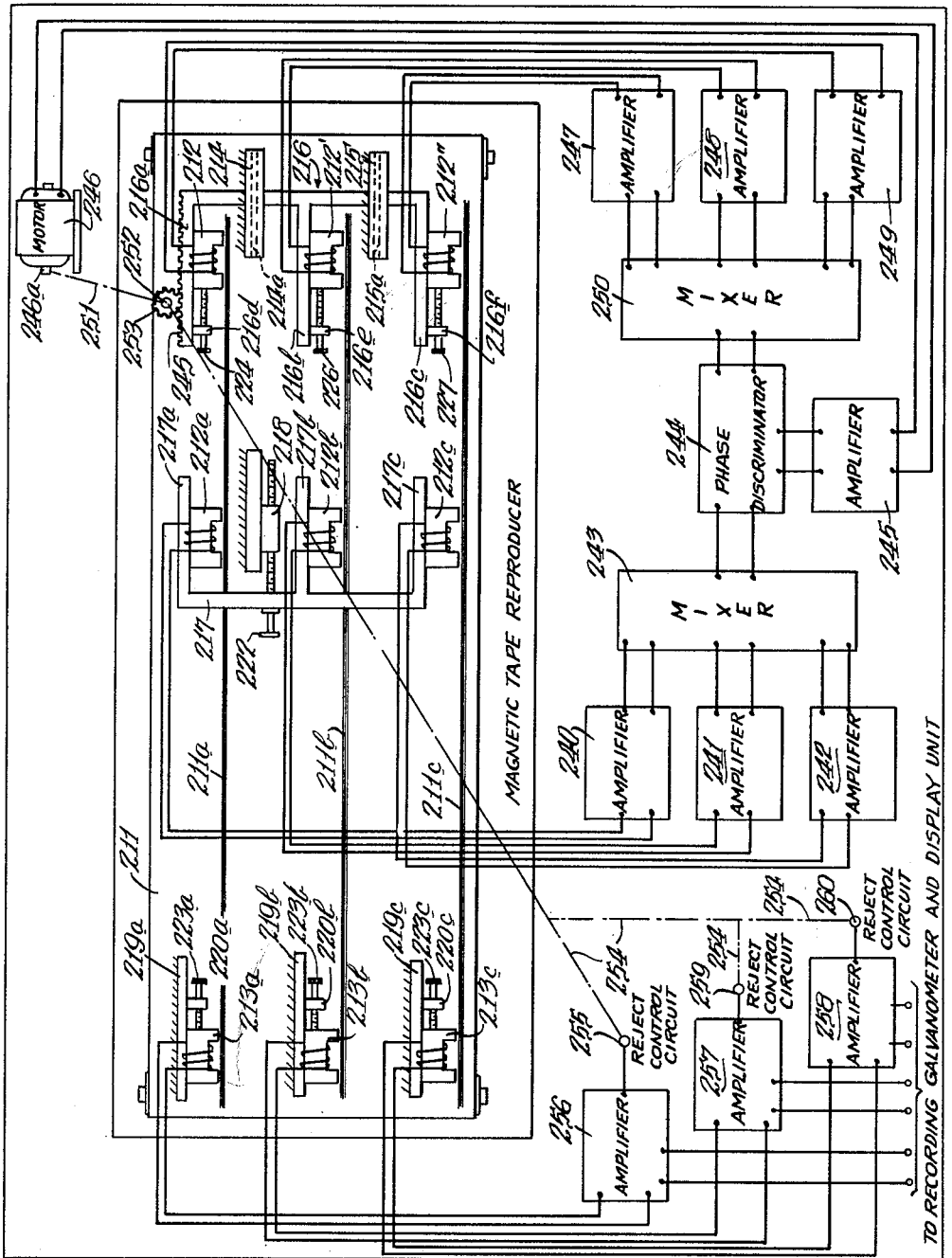

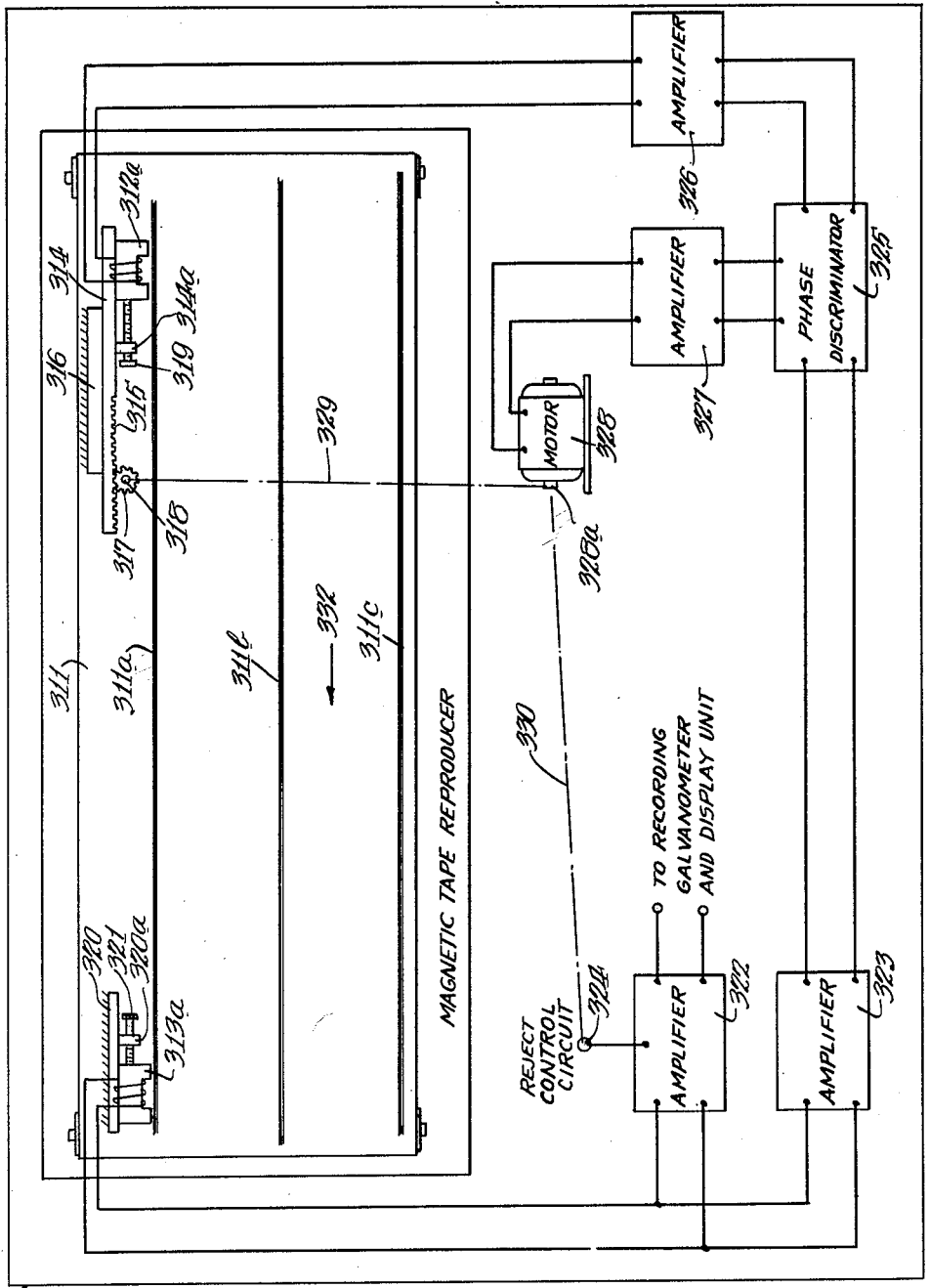

United States Patent Office 3,172,077
Patented Mar. 2, 1965

3,172,077
REPRODUCING AND TRANSLATING
APPARATUS
James E. Hawkins, Broken Arrow, Okla., assignor to
Seismograph Service Corporation, Tulsa, Okla., a corporation of Delaware
Filed Apr. 12, 1955, Ser. No. 500,758
29 Claims. (Cl. 340—15.5)

This invention relates generally to reproducing and translating apparatus for seismographic records and more particularly to improved apparatus for reproducing seismic signals recorded on a phonographically reproducible record and to apparatus associated therewith for translating the reproduced signals into visual form for observation.

The apparatus of the present invention is particularly useful in the analysis of seismographic records of the type customarily produced in geophysical prospecting. In conducting geophysical surveys of this nature, elastic waves are generally transmitted from a source, as by the detonation of explosives, and are either refracted by or reflected from subsurface formations to a plurality of spaced receptors or detectors located at the earth's surface. By measuring the time interval between the initial propagation of the wave and its arrival at each of the receptors, information is available for making a definite determination of the configuration and location of the subsurface formations. In one of the commonest arrangements for reflection shooting, a series of spaced detectors are located co-linearly with respect to the shot point and are spaced relatively close together at a considerable distance from the source of the seismic waves. Customarily all of the signals received at each of the spaced detectors are recorded in reproducible form as a function of time with respect to the instant of detonation of the explosives, either on separate records or as separate channels on the same record. For the purpose of facilitating interpretation, the records or signal channels, whichever the case may be, are arranged during reproduction in side by side relationship with points in transverse alignment representing signals received simultaneously at all of the detectors. However, it has long been recognized that the waves reflected from a particular subsurface stratum arriving at each of the detectors are spaced in time by an amount which is a function of the distance between the shot point and each of the detectors, the interval between arrivals at any two detectors in the array being termed the "step out" or "spread effect." Furthermore, the signals arriving at certain of the detectors are frequently delayed by various surface conditions existing in the earth's weathering layer near the detector locations. The delays in arrival of such reflected wave energy at the detectors complicate the interpretation of the records since they cause these reflected signals to appear at points on the records or channels which bear no apparent relationship one to the other inasmuch as they are not necessarily aligned when the records or channels are arranged as indicated above.

Proper interpretation of these records is also inhibited by virtue of the fact that the signals recorded from each of the detecting positions usually include a plurality of characteristic breaks or waves representative of energy reflected from subsurface strata which are not readily distinguishable from each other. For example, in those cases where the reflecting strata are not greatly differentiated from each other or are relatively thin, the reflections from one subsurface stratum may follow very closely in time the signals reflected from the adjacent stratum and, as a result, it is a common occurrence for the signals reflected from the first such stratum to be considerably stronger than those from the adjacent stratum. If the record contains such strong reflections it has generally been found desirable to prevent these signals from overloading the reproducing equipment, and, to this end, the reproducing equipment of the prior art usually includes an automatic volume control circuit or the like for controlling the amplification of signals of high magnitude. However, these automatic volume control circuits have usually been so designed that the amplification is decreased for a period of time somewhat subsequent to the reproduction of the strong signals and thus, weak reflections which may be reproduced during this period are completely lost. Thus, incomplete and misleading data concerning the nature of the subsurface formations often results.

Another factor preventing proper analysis of the seismic records is the fact that the reflection signals from the various strata are frequency differentiated only slightly, if at all, from spurious and undesired signals of indefinite nature which are received simultaneously at all of the detectors, such indefinite waves being produced by inherent random noises or by more or less sustained vibrations which may be termed steady state signals. One method previously suggested for distinguishing between the reflection signals and these waves of indefinite nature has been to adjust the amplifying circuitry of the reproducing equipment to the frequency of the reflection signals so that only those signals having a frequency falling within the frequency band of the reflected energy will be amplified, thus eliminating all signals having a frequency falling beyond this band. Normally, however, such an adjustment is effected during the recording operation by a process of trial and error which is both laborious and time consuming.

The general prior practice for eliminating the sustained vibrations or steady state signals reproduced from the record has been to provide a frequency reject filter capable of being adjusted to eliminate the undesired band of frequencies. Such filters have usually been adjusted manually during the recording of the seismic signals and only after the frequencies of the undesired steady state signals have been determined, a process which again requires considerable effort and time on the part of the record analyst.

It is, therefore, an object of the present invention to provide improved apparatus for reproducing the signals recorded on a phonographically reproducible record wherein the amplification of the reproducing equipment is automatically controlled to emphasize the reflection signals and to attenuate spurious and undesired signals.

Another object of the invention is to provide apparatus for reproducing signals recorded on a phonographically reproducible record in which the gain of the amplification circuits is automatically controlled to attenuate extremely strong signals without affecting the amplification of weak signals following closely thereafter.

It is a further object of the invention to provide reproducing apparatus including a pair of spaced reproducing heads arranged in the direction of travel of a photographically reproducible record in order to provide information from one of the heads for automatically controlling correlated signals reproduced by the other head.

A still further object fo the invention is to provide reproducing apparatus for reproducing the signals recorded as a plurality of signal channels upon a phonographically reproducible record including pairs of reproducing heads arranged on different signal channels from which cross correlation information between the channels is obtained and utilized.

It is also an object of the present invention to provide apparatus for reproducing the signals recorded on a phonographically reproducible record including means for automatically adjusting, during the reproduction of the signals, a band reject filter which eliminates sustained vibrations or steady state signals appearing on the record.

It is also an object of the present invention to provide improved reproducing and translating equipment for reproducing the signals recorded on a phonographically reproducible record and translating the same into visual indications wherein the reproduced signals are utilized to control the characteristics of the visual indications in order to emphasize desired ones of the translated signals.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 diagrammatically illustrates reproducing and translating apparatus embodying the present invention as used in automatically controlling the amplification of the reproduced signals;

FIG. 2 is a schematic diagram of certain of the circuits which were represented in block form in FIG. 1;

FIG. 3 diagrammatically illustrates apparatus embodying the present invention wherein signals are simultaneously reproduced from a plurality of signal channels and the information thus obtained is employed to control and correlate the signals appearing at the output of the reproducing apparatus;

FIG. 3a diagrammatically illustrates a recording galvanometer and associated circuitry suitable for use with the apparatus illustrated in FIG. 3;

FIG. 4 diagrammatically illustrates an alternative arrangement of the apparatus of the present invention when used in automatically adjusting the reproducing apparatus to accentuate the reflection signals and to attenuate signals having a frequency differing therefrom;

FIG. 4a is a schematic diagram of a frequency selective circuit suitable for use in the apparatus shown in FIG. 4;

FIG. 5 diagrammatically illustrates reproducing apparatus embodying the principles of the present invention when used to eliminate steady state signals automatically during signal reproduction.

FIG. 6 diagrammatically illustrates an alternative arrangement of the apparatus of the present invention for eliminating steady state signals; and FIG. 7 diagrammatically illustrates still another arrangement of the apparatus of the present invention when used to eliminate undesired steady state signals.

Referring now to the drawings, and more particularly to FIG. 1 thereof, there is shown apparatus, indicated generally by the reference numeral 10, for reproducing the signals recorded on a phonographically reproducible record or medium 11. The record 11 is illustrated in FIG. 1 as a magnetic tape or wire, although, it will be understood that this record may be of any type phonographically reproducible record within the definition of this term appearing in the Patent No. 2,051,153 to Frank Rieber, dated August 18, 1936. The seismic signals resulting from detonation of an explosive charge are transmitted through the earth both directly and through reflection and refraction from subsurface strata interfaces to a detector position and are converted to electrical energy for recording upon the record 11. As previously indicated, this record may contain a plurality of signal channels each representative of the seismic signals received at one of the spaced seismometers or detectors (not shown) in a detector array, although, in order to simplify the drawings, the reproducing equipment illustrated in FIG. 1 is intended for use in the reproduction of signals appearing on only one of these signal channels. It will be understood that if it is desired to reproduce all of the signals from a multi-channel record, the equipment shown in FIG. 1 may be modified by providing additional reproducing equipment for each additional channel to be reproduced in a manner to be subsequently described in detail.

For the purpose of reproducing the signals recorded on the record 11, the reproducing apparatus 10 includes a pair of spaced reproducing or play-back heads 12 and 13, the head 13 being designated simply a "reproducing head" while the head 12 is designated an "anticipating head" due to the unique functions performed by the signals reproduced by this head, as will be described in detail hereinafter. The tape 11 is moved in sequence past the pair of spaced reproducing heads 12 and 13 at substantially constant speed by means of a conventional tape drive mechanism indicated diagrammatically by the tape drive motor 14, the tape drive reels 15 and 16 and the drive connections between the motor and the reels represented by the alternate dot and dash lines 17. Since the record 11 is driven in a counter-clockwise direction, as indicated by the arrow pointed lines 19 in FIG. 1, the signals appearing on a single channel of the record will be reproduced by the anticipating head 12 prior to the reproduction of these same signals by the reproducing head 13, the length of the interval between the reproduction of identical signals by these two heads being a function both of the speed of travel of the record 11 and of the spacing between the two heads.

In order to amplify and control the signals reproduced by the reproducing head 13, these signals are applied to the input terminals of a suitable amplifier 20 preferably including a gain control circuit 20a of the variable impedance, automatic volume control type. The signals reproduced by the anticipating head 12 are applied to an amplifier and rectifier circuit 21 the output of which constitutes a unidirectional control signal having an amplitude varying as a function of the amplitude of the various signals continuously reproduced as the record 11 is moved past the head 12. This unidirectional control signal is applied to the input terminals 26a and 26b of a time delay circuit 26 which delays the signal for a fixed period of time and then develops an output signal across terminals 26c and 26d for application to the gain control circuit 20a in order to control the gain of the amplifier 20. It is desirable that the gain of the amplifier 20 for any particular signal reproduced by the head 13 be controlled in accordance with the amplitude of that particular signal. To this end, the unidirectional control signal appearing across terminals 26c and 26d and derived from the anticipating head 12 should be applied to the gain control circuit 20a at the instant when the same signal is reproduced by the head 13. As indicated above, however, the time difference between the reproduction of identical signals by the heads 12 and 13 is a function solely of the distance between the heads and the speed of movement of the tape 11. Therefore, since the tape 11 is driven at nearly constant speed, the time delay introduced by the delay circuit 26 should be constant for any particular separation of the reproducing heads 12 and 13. Thus, this time delay must be substantially independent of the amplitude of the input signals to the delay circuit 26 from the amplifier and rectifier 21 and also must be independent of the rate of change of these signals. In order to provide a time delay circuit satisfying these requirements, the unidirectional control signals from the amplifier and rectifier 21 may be recorded by a recording head 28a upon a suitable record medium 27 illustrated as a magnetic tape. The record 27 is driven at a rate correlated with the speed of drive of the seismographic record 11 by means of a synchronous motor 27a driven in synchronism with the tape drive motor 14. The unidirectional control signals recorded upon the record 27 are reproduced by a reproducing head 28b after a time delay equal to the period required for the record 27 to traverse the distance between the heads 28a and 28b. The control signals developed by the reproducing head 28b appear across output terminals 26c and 26d of the delay circuit 26 and are employed to energize gain control circuit 20a in order to vary the gain of the amplifier 20 in the manner described above.

From the foregoing description, it will be recognized that the spacing between the two heads 12 and 13 is such that the signals reproduced by the anticipating head 12 are employed to control the gain of the amplifier 20 at the instant when these same signals are applied to this amplifier from the reproducing head 13. Since conventional automatic volume control circuits introduce some time delay between the introduction of a high amplitude signal and the development of a unidirectional control signal, it is desirable that the delay period produced by the delay circuit 26 be considerably larger than that encountered in the automatic volume control circuit of the amplifier 20. In this manner, the delay between the production of a given signal by the anticipating head 12 and the application to the amplifier 20 of a gain control voltage corresponding to that signal is substantially independent of the magnitude of the small delay introduced by gain control circuit with the result that the total delay period provided is practically unaffected by the amplitude or rate of change of the signals produced by the amplifier and rectifier 21. Moreover, the time constant of the amplifier and rectifier 21 and the gain control circuit 20a should be as close to zero as possible in order to prevent high amplitude signals from reducing the gain of amplifier 20 for a duration somewhat subsequent to the passage of these signals. In this manner, weak signals immediately following strong signals in the record 11 are not lost and are passed to the recorder 24 and display unit 25 with sufficient amplitude to produce recognizable manifestations on the records produced by these units. In similar manner, a small time constant automatic volume control circuit prevents overdrive of the amplifier 20 by large amplitude signals which immediately follow low amplitude signals on the record 11. For the purpose of adjusting the spacing between the heads 12 and 13 in order to effect the desired time relationship between reproduced signals, the anticipating head is slidably mounted on suitable fixed structure 23 of the reproducing apparatus 10 and is moved thereon through the action of a manually adjustable lead screw 22 threadedly engaging a flange 23a on the structure 23. After the proper spacing between the anticipating head 12 and the reproducing head 13 has been found to provide the desired time interval between the reproduction of identical signals by the two heads, it is unlikely that further adjustment of position of the anticipating head will be required since the speed of movement of the tape is maintained constant.

By proper adjustment of the lead screw 22, it is apparent that high amplitude signals reproduced by the anticipating head 12 may be utilized to decrease the gain of the amplifier 20 at the exact instant when these same signals are applied thereto from the reproducing head 13 thus providing an automatic volume control for these high amplitude signals. However, when weak signals are reproduced by the anticipating head 12 the gain control circuit 20a does not function to decrease the gain of the amplifier 20 and, accordingly, when the same weak signals are applied to the input terminals of this amplifier from the reproducing head 13 they will be amplified in accordance with its normal gain. The control provided by the gain control circuit in cooperation with the signals from the amplifier and rectifier 21 is of brief duration and thus facilitates the amplification of weak reflection signals even though these signals may closely follow high amplitude signals on the record. In this manner, weak reflections which have previously been lost by the use of reproducing equipment of the prior art, are emphasized in order to facilitate a proper analysis of the record. Moreover, the refraction energy which normally appears on the record as a high amplitude signal occurring soon after the detonation of the explosive charge generating the seismic waves is controlled so that the rapid build-up and decay of this energy will not prevent the reproduction of signals appearing on the record immediately thereafter.

In order to convert the electrical signals appearing at the output of the amplifier 20 into visual form for observation, these signals are fed to a display unit 25 which may, for example, be of the type disclosed in U.S. Patent No. 2,594,767 to Robert P. Green. The display unit 25 creates a trace corresponding to the seismographic trace on the record 11 as reproduced by the reproducing head 13, and facilitates observation of the effects of adjustment of lead screw 22. Thus, by observing the trace on the oscillograph of the display unit, an operator may orient the reproducing head 12 in proper position with respect to the record 11, at which time the gain of the signals reproduced by the head 13 will be properly controlled since the spacing between the heads 12 and 13 will correspond to the time delay produced by the delay circuit 26.

In order to provide a permanent record for subsequent analysis and interpretation, the signals appearing at the output of the amplifier 20 are also applied to the signal input terminals of a recording apparatus 24 which may be of any type conventional in the art, such as, for example, a recording galvanometer as illustrated in FIG. 1. In a recording apparatus of this type the signals reproduced from each signal channel of the record 11 are employed to control the movement of a galvanometer which, through an optical system, projects a light beam upon a moving sensitized sheet in order to provide a graph of the reproduced signals as a function of time.

Referring now to FIG. 2, there is shown a schematic diagram of one particular type amplifier 20 and gain control circuit 20a which have been found to afford satisfactory results when employed in the reproducing apparatus of the present invention. The amplifier is illustrated as comprising three stages 30, 31 and 32, at least one of these stages, the stage 31, having its grid circuit connected to the gain control circuit 20a in order to provide means for automatically controlling the gain of the amplifier 20 in response to signals from the amplifier and rectifier 21. Obviously, the gain of any one of the stages of the amplifier 20 could be controlled, if desired, or, for that matter, the gain of more than one of these stages could be simultaneously controlled. The signals from the reproducing head 13 shown in FIG. 1 are applied between input terminals 33 and 34 of the amplifier 20 for application to the grid circuit of the first or pre-amplifier stage 30 through any suitable coupling means such as the transformer 35. The stage 30 is a conventional cathode biased amplifier circuit having output signals developed across plate load resistor 30a and applied to the grid circuit of the next succeeding stage 31 through the usual resistance-capacitance coupling network, consisting of resistor 31a and condenser 30b. In like manner, the output signals of the stage 31, which is, in effect, a variable gain amplifier, are developed across plate load resistor 31c and are coupled through condenser 31b to the grid circuit of the final amplifier stage 32 where these signals are impressed across grid leak resistor 32a. The final amplifier stage 32 produces signals, appearing across output terminals 36 and 37, for simultaneous application to the recording apparatus 24 to be translated into permanent records and to the display unit 25 to produce visual records for observation. Anode potential is supplied to the tubes of stages 30, 31 and 32 from an appropriate direct current source not shown in the drawings but indicated in conventional manner as B+.

As indicated above, the grid circuit of the variable gain amplifier stage 31, in addition to receiving the output signals of the stage 30, is also connected through a signal connector 38 to the variable impedance gain control circuit 20a. The latter circuit is energized through connectors 39 and 40 by the unidirectional control signals appearing across output terminals 26c and 26d and responds to these signals by altering the gain of the amplifier. Specifically, the variable impedance gain control circuit 20a comprises a pair of oppositely poled diode rectifiers 41 and 42 bridging the input circuit of the variable gain amplifier stage 31 between signal connector 38 and ground and wired in series with a biasing circuit which includes resistors 44 and 47 and biasing batteries 45 and 46 paralleled by series connected delay condensers 49 and 50. The time constant of the biasing circuit is determined by the resistance values of resistors 44 and 47, the capacitance value of the condensers 49 and 50 and the resistance values of series resistors 43 and 48 through which the unidirectional control signals appearing across terminals 26c and 26d are applied to the gain control circuit 20a. As will be understood by those skilled in the art, the diode rectifiers 41 and 42 have impedances which vary as a function of the magnitude of current flow therethrough and hence as a function of the voltages impressed thereacross. Regarding these rectifiers and their associated biasing circuit as a series network, it will be observed that the batteries 45 and 46 are so poled as normally to prevent current conduction through the space current paths of these rectifiers. Thus, normally the variable impedance gain control circuit 20a presents a very high shunt impedance across the input circuit of the amplifier stage 31 and more particularly between signal connector 38 and ground. By suitable choice of the voltages of the biasing batteries 41 and 42, any desired threshold may be established which must be exceeded by a biasing voltage of opposite polarity before space current flow through the rectifiers 41 and 42 may be started to lower the shunt impedance across the input circuit of the stage 31. Thus, when the unidirectional control signals appearing across terminals 26c and 26d exceed a predetermined amplitude, the biasing voltage of the batteries 45 and 46 is overcome and current flow through the rectifiers 41 and 42 is initiated.

Briefly to consider the operation of the gain control facilities, it will be understood that when a signal voltage representative of the seismic signals of a detected seismic wave train appears at the output side of the anticipating head 12, unidirectional control signals are developed by the amplifier and rectifier 21 having varying amplitudes which are at all times proportional to the amplitude of the signal voltage. These unidirectional control signals are delayed by the circuit 26 and then appear across the output terminals 26c and 26d for application through resistors 43 and 48 of the biasing circuit in the variable impedance gain control circuit 20a. These unidirectional control signals are of opposite polarity to the direct current voltages of the batteries 45 and 46. So long, however, as the magnitude of the unidirectional control signal does not exceed the combined voltages of the batteries 45 and 46, the rectifiers 41 and 42 remain non-conductive to prevent any decrease in the shunt impedance across the input circuit of the variable gain amplifier stage 31.

Assume now that the amplitude of the control signals appearing across terminals 26c and 26d is in excess of the combined voltage of the two batteries 45 and 46. When this occurs, a net voltage is impressed across the series connected rectifiers 41 and 42 with proper polarity to effect current conduction therethrough. As a consequence, the internal impedances of the rectifiers decrease to produce a corresponding decrease in the impedance between signal connector 38 and ground. The extent to which the impedances of rectifiers 41 and 42 are decreased varies as a direct function of the magnitude of current flow therethrough. Thus, during a rising signal amplitude period, current conduction through the rectifiers is progressively increased to effect a progressive decrease in the impedance between signal connector 38 and ground. Conversely, during a period of decreasing signal amplitude, current conduction through the rectifiers is decreased to effect a corresponding increase in the impedance between signal connector 38 and ground.

The effect of decreasing the impedance of the gain control circuit 20a in the manner just described is that of decreasing the ratio of the voltage appearing between signal connector 38 and ground and that appearing across the plate load resistor 30a of the preamplifier stage 30. In other words, the input electrodes of the variable gain amplifier stage 31 are robbed of a variable portion of the signal voltage appearing across the output terminals of the preamplifier stage 30. Thus, as the impedance of the gain control circuit 20a is decreased, the signal voltage drop across the resistor 31a is correspondingly increased relative to the output of the stage 30 and the input to stage 31 suffers a corresponding decrease.

As indicated above, the condensers 49 and 50 and the various resistors in the gain control circuit 20a determine the time constant or rate of gain change resulting from a predetermined rate of signal voltage change at the output side of the delay circuit 26. By proper selection of these components, this time constant may be made extremely small in order to effect an almost instantaneous variation of the gain of the amplifier 20 in response to a corresponding variation in the amplitude of the control signals. Thus, high amplitude control signals are prevented from reducing the gain of amplifier 20 for a period of time extending beyond their passage through the amplifier with the result that weak signals immediately following such high amplitude signals are amplified in accordance with the normal gain of the amplifier 20. Similarly, since the gain of the amplifier 20 is altered in direct correspondence to the amplitude of the control signals appearing across terminals 26c and 26d, it is evident that high amplitude signals from the reproducing head 13 are prevented from overdriving and blocking the amplifier. Since the time delay between the application of control signals from terminals 26c and 26d and the alteration of the gain of the amplifier 20 is extremely small due to the values of the two condensers and four resistors in the gain control circuit 20a, this delay period is negligible when compared with the time delay effected by the circuit 26. Thus, the total elapsed time between the reproduction of a signal by the anticipating head 12 and the alteration of the gain of amplifier 20 in accordance with the amplitude of that signal, is practically constant and is, for all practical purposes, a result solely of the delay introduced by the delay circuit 26. As a consequence, the magnitude of this total elapsed time is substantially independent both of the amplitude and the rate of change of the signals reproduced by the anticipating head 12. This total elapsed time is preferably made equal to the time required for a single point on the record 11 to traverse the distance between the heads 12 and 13 by adjusting the lead screw 22 until the signal trace appearing on the display unit 25 assumes the desired characteristics. When the lead screw is properly adjusted, a particular signal reproduced by the anticipating head 12 will cause the gain of the amplifier 20 to be altered in accordance with its amplitude at the instant when the same signal is applied to the amplifier from the reproducing head 13, thereby to effect a completely automatic gain control wherein the gain of the amplifier is inversely proportional to the amplitude of the signals applied across its input terminals 33 and 34.

As previously mentioned, the records obtained during the seismic survey frequently contain reflection signals completely submerged in the spurious vibrations simultaneously arriving at all of the detector positions, and, as a result, the reflection signals on each trace are extremely difficult to recognize. One method for distinguishing the reflection signals from the spurious vibrations is described in the Patent No. 2,243,729 to Lacoste G. Ellis, issued May 27, 1941, and consists of adding the instantaneous values of the signals recorded at each detector after corrections have been introduced for varying surface conditions at each detector and for the step out of the detector arrangement. A variation of this principle has been employed, in accordance with a feature of the present invention, to obtain improved reproduction of the reflection signals while at the same time suppressing those signals which do not aid in the interpretation of the record. Specifically, referring now to FIG. 3 of the drawings, reproducing apparatus 110 is there shown which is adapted to reproduce signals recorded as a plurality of spaced signal channels or traces 111a, 111b and 111c on a record 111 illustrated as a magnetic tape. It will be understood that each of the signal channels or traces 111a, 111b and 111c corresponds to the signals received at one of the detectors and, therefore, the record 111 may actually include any number of such traces or channels equal in number to the number of detectors in the array even though only three traces are shown on the record depicted in FIG. 3. For the purpose of reproducing the signals on the record 111, each signal channel has associated therewith a pair of heads comprising a reproducing head and an anticipating head, the reproducing heads for the channels 111a, 111b and 111c being designated by the reference characters 113a, 113b and 113c, respectively, and the anticipating heads being designated 112a, 112b and 112c, respectively. The record 111 is driven at substantially constant speed past these heads in the direction indicated by the arrow 119 by means of suitable mechanism (not shown) connected to drive shaft 117 of a tape driving reel 118. The pair of heads associated with each signal channel is adjustably mounted for separate movement longitudinally of the tape upon an elongated bar 120 pivoted on studs 121. In particular, the position of each of the anticipating heads along its associated bar may be adjusted by means of a manually adjustable lead screw 122 threadedly engaging a flange 120a fixedly mounted on the bar 120. In similar manner, the position of each of the reproducing heads with respect to its associated bar may be adjusted by a manually adjustable lead screw 123 engaging a flange 120b on the bar. In order to provide for movement in unison of the pair of heads associated with each bar to correct for varying surface conditions at each detector in a manner to be subsequently described in detail, the studs 121 may be adjustably positioned within slots 124 extending transversely of a lever 125. The latter is pivoted about a pin 126 mounted on fixed structure of the reproducing apparatus 110 and has a roller 127 mounted on its free end and urged by a spring 128 into engagement with a track 129 of predetermined configuration. For the purpose of adjusting in unison the position of each pair of heads with respect to its associated channel to correct for the step out of the detector arrangement as described more fully hereinafter, the track 129 may comprise a flexible strip secured to a plurality of spaced rods 130, the ends of which may be adjusted to extend variable distances from the edge of a rack 131 by means of a manually adjustable clamp device 132. The rack 131, suitably guided by structure not shown for reciprocable movement in the direction of its length, is arranged to be driven by a pinion 133 carried by a shaft 134, the latter being driven in synchronism with the shaft 117 of the tape drive mechanism.

In order to provide for the amplification of the signals reproduced by the anticipating heads 112a, 112b and 112c these signals are respectively applied to the signal input terminals of amplifiers 135, 136 and 137. The output signals developed by these amplifiers are applied to the input terminals of a mixer 138 which functions to produce at its output terminals a signal representative of a linear addition of the instantaneous signals reproduced by the anticipating heads. To prevent overloading of the amplifiers 135, 136 and 137 or of the mixer 138 by signals of excessive amplitude, each of the amplifiers has associated therewith an automatic volume control circuit 139 which functions to decrease the gain of its associated amplifier for high amplitude signals in a conventional manner. The output signals of the mixer 138 are passed through a time delay circuit 26 of the type shown in FIG. 1 and, after a suitable delay period, are rectified and averaged by the rectifier circuit 140 in order to provide a control signal at its output connectors 141 and 142 having an amplitude which is a function of the linear addition of the instantaneous signals reproduced by all of the anticipating heads.

For the purpose of amplifying the signals reproduced by the reproducing heads 113a, 113b and 113c, the signals therefrom are respectively applied to the signal input terminals of amplifiers 143, 144 and 145. These amplifiers may be of the same general type as the amplifier 20 shown schematically in FIG. 2 and previously described and, like the amplifier 20, each has associated therewith a variable impedance gain control circuit 146 which may be of the same general type as the gain control circuit 20a described above. However, the gain control circuit 146 is operated in what might be termed a "reverse operation" since the batteries in its biasing circuit are so connected that the rectifiers are normally conducting so that the application of control signals to the circuit causes an increase in its impedance. Thus the unidirectional signals appearing between the output connectors 141 and 142 of the rectifier 140 are simultaneously applied to each of the gain control circuit 146, the polarity of these signals being such that the gain of each of the amplifiers 143, 144 and 145 is directly proportional to the magnitude of the control signal, i.e., the greater the amplitude of the control signal the larger the gain of the amplifiers 143, 144 and 145.

The output signal from mixer 138 is a maximum when the signals applied to its sets of input terminals from the amplifiers 135, 136 and 137 are in phase. It will be recognized that an inphase relationship would exist between signals reflected from one particular subsurface stratum arriving at each of the detectors if these detectors were all located at a single point on the earth's surface. However, points on the individual signal traces 111a, 111b and 111c which are representative of the energy reflected from such a stratum are generally not aligned transversely of the record 111 by virtue of the fact that such transversely aligned points are merely indicative of the simultaneous time of arrival of different signals at each of the spaced detectors. As previously mentioned, the time of arrival of the energy reflected from each stratum at the detectors is a function of the horizontal distance between each detector and the shot point, i.e., the arrival varies due to the step out of the detector arrangement, and, in addition, this reflected energy may be delayed by surface conditions existing at certain of the detectors.

The delay introduced by the existence of such a surface condition at any one of the detectors may be compensated for during the reproduction of the record by adjusting the position of the stud 121 within the slot 124 in order to move in unison the anticipating head and the reproducing head associated with the particular signal trace representative of signals received at that detector by a distance corresponding to the delay. When each of the bars 120 has been adjusted in this manner to correct for the surface conditions existing at each detector, all of the anticipating heads and all of the reproducing heads reproduce portions of the traces which would have been recorded simultaneously if the disturbing surface conditions did not exist.

The delay in arrival of the signals caused by the spacing between detectors may be compensated for by moving the lever 125 to adjust in unison the relative positions of each pair of heads along its associated trace by an amount corresponding in time to that delay as disclosed in the above identified Ellis patent. As described therein, movement of the rack 131 pivots lever 125 about the pin 126 to adjust the relative position of each of the bars 120 carrying the reproducing and anticipating heads. The extent to which the lever 125 is pivoted is determined by the shape of the track 129 which in turn may be adjusted by means of the clamps 132 and the adjustable arms 130 in accordance with the step out of the detector arrangement.

When the lever 125 is pivoted about the pin 126 it is apparent that the anticipating head 112c and the reproducing head 113c will be moved along the trace 111c, which represents the signals recorded at the detector located at the greatest distance from the shot point, by a distance greater than the compensation provided for either of the other signal traces 111a or 111b. Thus, when the lever 125 is pivoted about the pin 126 each pair of heads is moved longitudinally along its associated trace by an amount corresponding to the spacing between detectors. After the adjustments to correct for both step out and varying surface conditions have been made, the signals reproduced by the spaced anticipating heads 112a, 112b and 112c are representative of those signals which would have been received if all of the detectors had been located at exactly the same position. When these signals are amplified and then applied to the mixer 138, those signals representative of the energy reflected from each subsurface stratum are in phase whereas signals representative of the random noises and other spurious vibrations have no particular phase relationship. As a result, the mixer 138 linearly adds the signals corresponding to the reflected energy and produces a maximum signal at its output while the sum of those signals having no particular phase relationship produces at the output of the mixture a signal of insignificant amplitude. Thus the only signals of appreciable magnitude applied to the rectifier 140 from the delay circuit 26 are those derived from a linear addition of the reflected wave energy appearing on the spaced signal traces of the record 111.

In order to insure that the control signal from the rectifier 140 increases the gain of the amplifiers 143, 144 and 145 at the exact instant when the reflected wave energy is reproduced by the reproducing heads 113a, 113b and 113c, the spacing between the anticipating heads and the reproducing heads of each pair may be adjusted by means of the manually adjustable lead screws 122 and 123 while observing the signal traces appearing on oscillograph of the display unit 25 to which the signals from amplifiers 143, 144 and 145 are applied. Generally the spacing between each reproducing head and its associated anticipating head will be the same for all signal channels and, since the record 111 is driven at constant speed, it will not be necessary to alter this adjustment once the desired time relationship between signals reproduced by the spaced heads has been established.

From the foregoing explanation, it will be apparent that the anticipating heads reproduce signals which are employed to insure that the gain of the amplifiers 143, 144 and 145 is relatively high during the instant when the reproducing heads 113a, 113b and 113c reproduce signals representative of the reflected wave energy appearing on the record 111 whereas the gain of these three amplifiers at all other times is maintained relatively low, thereby emphasizing the reflected wave energy. Thus the signals applied to recording apparatus 124 shown in FIG. 3a from each of the amplifiers 143, 144 and 145 includes signals of relatively high amplitude corresponding to the reflected wave energy received at each detector and signals of extremely low amplitude representative of all other signals received at the detectors thereby facilitating identification of the reflected energy appearing on the visual graph of the signals produced by the recording apparatus.

In order further to emphasize the reflected wave energy when translated into visual indications, the signals at the output of the rectifier 140 appearing between signal connectors 141 and 142 may be employed to enhance those portions of the recorded graph representative of the reflection signals. For example, when recording galvanometers are employed as the recording apparatus the unidirectional control signal developed by the rectifier 140, appearing across terminals 147 and 148, may be used to control the galvanometer intensity as shown in FIG. 3a. As there illustrated, the unidirectional control signal appearing across terminals 147 and 148 and applied to the input circuit of an intensity control circuit is of proper polarity to increase the intensity of the recorded indications at the exact instant when the reflected wave energy is passed by the amplifiers 143, 144 and 145 to the galvanometer deflection circuits, thereby enabling the reflections to stand out in intensity on the record as compared to the intervals when random energy is passed by the amplifiers 143, 144 and 145. Specifically, the galvanometer intensity control circuit of the recording galvanometer 124 comprises a triode amplifier which is biased to a suitable threshold value by a biasing battery 150 connected to the control grid of the amplifier tube through a series resistor 151. The input signals to the amplifier from terminals 147 and 148 are applied through a conventional coupling capacitor 152 in the grid circuit. A cathode biasing network comprising resistor 153 and a shunt connected condenser 154 may be employed in the cathode circuit of the amplifier. Operating potential for the amplifier is applied to the plate from an appropriate direct current supply through plate load resistor 156. For the purpose of controlling the intensity of the galvanometer producing the records, the output signals developed by the amplifier 149 are applied through a coupling condenser 157 to the galvanometer spot producing source 158. As will be understood by those skilled in the art, whenever the unidirectional control signals from the rectifier 140 exceeds a predetermined value, sufficient to overcome the bias voltage produced by battery 150, the triode of the amplifier conducts to develop an output signal across the plate load resistor 156 having an amplitude directly proportional to the magnitude of the signal applied to the input circuit of the amplifier. The current flowing through the galvanometer spot control is, of course, directly proportional to the amplitude of the signal appearing across plate load resistor 156 with the result that the intensity of the light produced by the source is a function of the magnitude of the unidirectional control signal produced by the rectifier 140.

In order to control the deflection of the beam produced by the light source 158, the output signals from amplifiers 143, 144 and 145 are respectively applied to galvanometer control coils 160a, 160b, and 160c which function in conventional manner, to control reflectors 161a, 161b and 161c. Thus, the beams of light impinging upon the reflectors through an optical system indicated generally as 159 are each deflected across the sensitized surface of a record medium 166, driven in the direction of arrow 162a at any suitable speed by a record drive mechanism, comprising motor 163 and record supporting rollers 164 and 165 mechanically coupled to the motor as indicated by the dotted lines 163a in FIG. 3a. Deflection of each of the beams reflected from the controlled reflectors 161a, 161b and 161c produces three traces oriented in side by side positions on the medium 166 and each representative of the seismic signals of one of the signal channels reproduced from the record 111. Since the amplifiers 143, 144 and 145 are controlled in the manner described above to possess maximum gain when signals corresponding to the reflected wave energy are reproduced by the anticipating heads 112a, 112b and 112c, the beams impinging upon the sensitized medium are subjected to their greatest deflection at the instants when signals corresponding to this reflected wave energy are passed to the galvanometer deflection coils 160a, 160b and 160c. Thus, the signals corresponding to the reflected wave energy appearing on the signal traces of the record 166 stand out by virtue of the fact that they are deflected to a greater degree than the random noises or other spurious signals appearing on these traces as indicated by the portions of the traces designated A, B and C. Moreover, since the unidirectional control signals appearing across terminals 147 and 148 and applied to galvanometer spot producing source are also a maximum when the anticipating heads 112a, 112b and 112c reproduce signals corresponding to the reflected wave energy appearing on the seismographic record 111, the intensity of the deflected means will be increased at the instants when signals corresponding to the reflected wave energy are passed to the deflection coils 160a, 160b and 160c. Thus, those signals appearing on the traces of the record 166 which correspond to the reflected wave energy are also accentuated by virtue of the fact that they are characterized by a thicker or more visible portion of the trace than those portions corresponding to the random noise or spurious signals, as also indicated by the regions of the traces labeled A, B and C. As a result, the reflected wave energy is clearly recognizable and interpretation of the records is enhanced.

An alternative arrangement of the reproducing apparatus of the present invention which may be employed for the purpose of accentuating the reflection signals appearing on the record 111 is shown in FIG. 4. The equipment illustrated therein is identical to that shown in FIG. 3 except that the rectifier 140 of the latter has been replaced by the elements appearing within the dotted line block 170 of FIG. 4, these elements comprising a frequency sensitive circuit or discriminator 171. The latter circuit functions to develop control signals for automatically adjusting the gain of the amplifiers 143, 144 and 145 in order to maximize signals having a frequency corresponding to that of the reflected wave energy on the record 111. As in the apparatus of FIG. 3, the mixer 138 linearly adds the signals from the anticipating heads 112a, 112b and 112c after the positions of these heads have been adjusted in the manner previously described in order to compensate for varying surface conditions at the detectors and for the step out of the detector array. As previously indicated, the signal output of the mixer 138 is a maximum when the anticipating heads reproduce the reflected wave energy from the record 111 since at this time the signals applied to the sets of input terminals of the mixer are all in phase. The signals appearing at the output of the mixer are applied through time delay circuit 26 to the frequency discriminator 171 which functions to develop unidirectional output signals varying in amplitude in accordance with the deviation of the frequency supplied to the input terminals from a predetermined frequency corresponding to that of the reflected wave energy.

It is well known, that within a given area of somewhat limited extent the energy reflected from the subsurface strata will be peaked or concentrated within a particular and relatively narrow band of frequencies due principally to the fact that the earth's subsurface formations present a higher impedance to signals falling outside of that particular band. Thus, if the reproducing equipment is capable of distinguisihng between the band of frequencies in which the reflected energy is concentrated and all other signals, a considerable amount of the undesired vibrations can be eliminated without losing the desired reflected wave energy. The selection of the particular band of frequencies to be retained presents a rather difficult problem when it is considered that the reflected wave energy is concentrated in different frequency bands in different regions which regions may at times be so closely spaced that they fall within the area under survey. However, an experienced analyst will be able to ascertain that within the area to which the record 111 pertains the signals of a given frequency contain a preponderance of the reflection energy and with this information the frequency discriminator 171 may be adjusted until it develops a unidirectional control signal of maximum amplitude in response to input signals of the given frequency. As previously indicated, the polarity of this control signal is such that when it is applied to associated variable impedance gain control circuits, the gain of the amplifiers 143, 144 and 145 is appreciably increased. The discriminator 171 possesses a fairly broad frequency response characteristic and, as a consequence, provides a relatively high amplitude control signal output for input signals differing by several cycles from the given frequency, thereby maintaining a high gain of the amplifiers 143, 144 and 145 for the entire band of frequencies containing the major portion of the reflected wave energy. The spacing between each anticipating head and its associated reproducing head may again be adjusted through observation of the signal traces on the display unit by means of the lead screws 122 and 123 so that the gain control circuits increase the gain of the amplifiers 143, 144 and 145 at the instant when the reflected wave signals reproduced by reproducing heads 113a, 113b and 113c are applied to the signal input terminals of their respective amplifiers. Thus the gain of the amplifiers 143, 144 and 145 is automatically adjusted to emphasize those signals reproduced from the record 111 having a frequency within the band containing most of the reflected wave energy and to provide little or no amplification for signals having a frequency falling outside of that band. The heart of the frequency discriminator 171 is a conventional frequency sensitive Wien bridge, comprising fixed resistors 186, 187 and 188, fixed condenser 191, variable resistor 189 and variable condenser 190, which bridge functions to develop output signals for application to the input circuit of a triode amplifier 192. The variable parameters of the bridge circuit are adjusted so that the bridge is sensitive to and nulls upon the particular band of frequencies in which the reflected wave energy is concentrated and, as a consequence, the bridge develops little or no output for signals having frequencies within that particular band but passes signals of appreciable amplitude to amplifier 192 whenever the input signals to the bridge deviate from the desired band. The amplifier 192, of course, performs the usual amplification function and applies its output signals through an output transformer 193 to a full wave rectifier 194 preferably of the conventional bridge type construction.

The rectifier 194 develops a unidirectional control signal having an amplitude directly proportional to the output signals of amplifier 192 and applies this control signal to variable impedance automatic gain control circuits 146a which are adapted to replace the gain control circuit 146 shown in FIG. 4. The gain control circuits 146a, as will be observed from a comparison of FIGS. 2 and 4a, are each identical to the variable impedance gain control circuit 20a described above. Specifically, batteries 195 and 196 of the gain control circuits 146a are so poled that the rectifiers 197 and 198 of this circuit are normally non-conductive in order normally to maintain the impedance of the gain control circuit relatively high and to maintain a corresponding relatively high gain of the amplifiers 143, 144 and 145 associated with the gain control circuits. The unidirectional control signals from the frequency sensitive bridge circuit are of such polarity that they are in opposition to the voltages of the batteries 195 and 196 and, accordingly, whenever the amplitude of these control signals exceeds a predetermined value conduction through the diode rectifiers 197 and 198 is initiated simultaneously to reduce the impedance of all of the gain control circuits 146a and to decrease the gains of amplifiers 143, 144 and 145.

From the foregoing explanation it will be apparent that in the operation of the system shown in FIG. 4a, the variable resistor 189 and the variable condenser 190 are adjusted so that the Wien bridge is sensitive to a fairly broad band of frequencies centered near the frequency of the signals reproduced by anticipating heads 112a, 112b and 112c which correspond to the reflected seismic wave signals. Thus, the Wien bridge develops an output signal of negligible value when the input signals across terminals 170a and 171a are of a frequency corresponding to this band. As a result, the bridge fails to produce an output signal in response to the reflected wave energy reproduced from the record 111 by the anticipating heads. However, whenever the random noise or other spurious signals reproduced from the record are passed from the delay circuit 26 to input terminals 170a and 171a, the major portion of these signals will fall beyond the frequency band to which the Wien bridge is sensitive with the result that output signals of appreciable amplitude will be passed through the amplifier 192 for rectification by the full wave rectifier 194. The output of the latter rectifier thus comprises a unidirectional control signal of relatively high value whenever the input signals to the Wien bridge fall beyond the band to which it is sensitive and a unidirectional signal of negligible amplitude whenever the input signals fall within that band. These unidirectional signals of negligible amplitude have no effect on the variable impedance gain control circuits 146a and, accordingly, the rectifiers 197 and 198 of these circuits remain non-conductive whenever signals having frequencies corresponding to the seismic wave reflections are passed to the frequency sensitive circuit 160a. The time delay circuit 26 correlates the application of control signals to the gain control circuits 146a with the application of input signals to the amplifiers 143, 144 and 145 from the reproducing heads 113a, 113b and 113c, with the result that the gain of the amplifiers is relatively high whenever signals having frequencies corresponding to the reflected wave energy are passed to the amplifier. However, at the time when signals falling beyond the band containing the reflected wave energy are passed to the amplifiers 143, 144 and 145 the gains thereof are reduced by the gain control circuits 146a in response to the unidirectional control signals of relatively high amplitude produced by the frequency sensitive circuit 171. As a result, the signals passed to the recording apparatus 124 and to the display unit 25 will be peaked to the frequency of the reflected wave energy and recognizable indications corresponding to this energy will be produced upon the signal traces of both of these devices.

It will be recognized that, if desired, the unidirectional output signals of the frequency sensitive circuit 171 shown in FIG. 4a could be used to increase the intensity of the records produced by the recording apparatus 124 at points therealong corresponding to the reflected wave signals in the manner pointed out above in connection with the description of the apparatus shown in FIG. 3a. However, since the unidirectional signals from the frequency sensitive circuit 171 may be of different polarity, due account must be taken of this fact in applying these signals to the galvanometer intensity control circuit. In this connection, it will be understood by those skilled in the art that any difference of polarity in the control signals may be fully compensated for merely by reversing the input connections to the galvanometer intensity circuit or, in the alternative by employing a phase inverter circuit of conventional construction in the input circuit of the galvanometer intensity control circuit.

As previously mentioned, the signals received at each of the detectors may include, in addition to the signals reflected from the subsurface strata and the spurious vibrations discussed above, undesired sustained vibrations or steady state signals having a constant frequency. It is, of course, desirable to eliminate the latter in order to facilitate recognition of the reflected wave energy. To this end, the reproducing equipment of the present invention may be arranged as shown in FIG. 5 wherein there is illustrated apparatus 210 for reproducing from a record 211 signals representative of the seismic events occurring at each of the seismic wave detectors in an array. The record 211 may contain a plurality of separate signal traces or channels equal in number to the number of detectors in the array and each representative of the signals arriving at one of the detectors, although only three such channels 211a, 211b and 211c are shown in FIG. 5.

Each of the traces has associated therewith facilities for automatically eliminating the undesired steady state signals, but, since the facilities provided for each trace are identical, only one complete set has been shown in FIG. 5. Thus, the illustrated facilities are associated with the signal trace 211a and comprise the component elements shown in solid lines including a pair of spaced anticipating heads 212 and 212a and a reproducing head 213a. In order diagrammatically to illustrate that similar equipment is associated with each of the other signal traces on the record 211, there is shown in dotted lines a pair of anticipating heads 212′ and 212b and a reproducing head 213b associated with the signal trace 211b and a pair of anticipating heads 212″ and 212c and a reproducing head 213c associated with the signal trace 211c. The operation of only one set of these facilities will be described in detail, since it will be understood that the equipment provided for the other channels functions in a similar manner.

For the purpose of amplifying the signals reproduced by the reproducing head 213a, these signals are applied to an amplifier 236 which is of the type including a band reject filter capable of being adjusted through control shaft 235 to eliminate any desired band of frequencies from the signals reproduced by the head 213a. The signals from the amplifier 236, after the undesired frequency band has been eliminated in a manner to be subsequently described in detail, appear across output terminals 237 and 238 and are passed to the recording apparatus in order to produce a permanent record of these signals as previously described. The purpose of the reject filter of the amplifier 236 is to eliminate all undesired steady state signals which may have been recorded on the record 211 simultaneously with the seismic events. The manner in which this desired result is accomplished will become evident from the ensuing description.

The anticipating heads 212 and 212a and the reproducing head 213a associated with the signal trace 211a are all slidably mounted upon an elongated bar 220 extending generally in the direction of movement of the record 211. The position of the anticipating head 212a along the bar 220 may be adjusted by means of a lead screw 222 threadedly engaging a flange 220a on the bar. In a similar manner, the position of the reproducing head 213a along the bar 220 may be adjusted by a lead screw 223 in engagement with a flange 220b on the bar. The position of the anticipating head 212 along the bar 220 may be varied in two ways, the first of which is effected by adjusting a lead screw 224 in engagement with a flange 225a on a rack gear 225 and the second of which is effected by movement of the rack gear 225 in a manner to be subsequently described in detail.

The signals reproduced by the anticipating head 212 are applied through an amplifier 226 to one set of signal input terminals of a phase discriminator 227 while the signals reproduced by the anticipating head 212a are applied through amplifier 228 to a second set of signal input terminals of this phase discriminator. The phase discriminator is excited by the two signals simultaneously applied to its two sets of signal input terminals and produces a unidirectional control signal having a magnitude which is directly proportional to the difference in phase between the two applied signals. More specifically, if the two signals applied to the phase discriminator 227 from the anticipating heads 212 and 212a bear no particular phase relationship one to the other, that is to say the two signals reproduced by the spaced anticipating heads are of different frequency, the phase discriminator will be insensitive to these signals and, accordingly, no control signal will be developed at its output. If, however, the two applied signals are of identical frequency but are out of phase, the phase discriminator develops a control signal having an amplitude which is a function of the phase difference. Obviously, if the two applied signals are of identical frequency and have the same phase, the phase discriminator will not develop a control signal.

In order to amplify the control signal developed by the phase discriminator 227 to a sufficient amplitude to control the rotation of motor 229, this control signal is applied to an amplifier 230. For the purpose of driving the rack gear 225 through a rack drive gear 233, the motor 229 has its output shaft 229a mechanically connected, as indicated by the alternate dot and dash line 231, to a shaft 232 mounting the rack drive gear. The shaft 232, as indicated by the alternate dot and dash line 234, is mechanically coupled to the control shaft 235 of the frequency reject filter included in the amplifier 236.

From the preceding explanation, it will be apparent that, as the record 211 is moved in the direction indicated by the arrow 211d by suitable tape drive mechanism, the two anticipating heads 212 and 212a provide a pair of control signals for automatically adjusting the frequency selection characteristics of the reject filter in the amplifier 236. Thus, for example, if the signal traces appearing on the record 211 contain steady state signals of constant frequency, such signals will be reproduced at different times by all three of the spaced heads 212, 212a and 213a. Since, the steady state signals reproduced by the anticipating heads 212 and 212a are of identical frequency, they will excite the phase discriminator 227 to produce a control signal at its output terminals unless, of course, the anticipating heads are spaced apart by the exact distance necessary to provide for the application of signals of the same phase to the two sets of input terminals of the phase discriminator. The latter condition will exist only if the anticipating heads 212 and 212a are separated by one wave length of the steady state signal or by an integral number of such wave lengths. As previously mentioned, if the anticipating heads 212 and 212a are not so spaced, the phase discriminator 227 develops a control signal for initiating operation of the motor 229. Rotation of the motor shaft 229a turns the rack drive gear 233 and induces linear movement of the rack 225 which is reciprocably mounted upon suitable structure affixed to the reproducing apparatus 210. Movement of the rack 225 obviously moves the anticipating head 212 along the bar 220 in a direction to reduce the phase difference between the signal reproduced by the head 212 and that reproduced by the anticipating head 212a. When the anticipating heads 212 and 212a are separated by exactly one wave length of the steady state signal or by an integral number of wave lengths, the phase discriminator 227 ceases to develop a control signal and operation of the motor 229 is terminated. The movement of the rack 225 is coordinated with the rotation of the reject filter control shaft 235, whereby, when the motor 229 ceases to operate, the shaft 235 occupies a position corresponding to the position occupied by the rack 225. The control shaft 235 adjusts the frequency characteristics of the reject filter in order to cause that filter to eliminate all signals having a frequency corresponding to the spacing between the anticipating heads 212 and 212a. Obviously, any variation in spacing between the anticipating heads by movement of the rack 225 induces a corresponding movement of the filter control shaft 235 to change the particular band of frequencies rejected.

In the operation of the equipment illustrated in FIG. 5, the spacing between the reproducing head 213a and the anticipating head 212a is adjusted by means of the lead screws 222 and 223 in order to establish the proper time relationship between the reproduction of the same signals by the anticipating head 212a and the reproducing head 213a. More particularly, the lead screws 222 and 223 are adjusted so that the reject filter control shaft 235 is turned, in the manner indicated above, to eliminate undesired steady state signals at the exact instant when these signals are applied to the amplifier 236 from the reproducing head 213a. The initial spacing between the anticipating heads 212 and 212a is adjusted by the lead screw 222 to any desired value, the particular spacing selected being determined by the operator to provide optimum results. The position of the anticipating head 212 along the rack gear 225 is adjusted by means of the lead screw 224 to obtain correspondence between the position of the rack gear and the position assumed by the control shaft 235 of the reject filter. Obviously, the lead screw 224 effects movement of the anticipating head 212 independently of the control shaft 235 and facilitates an initial adjustment of the position of the anticipating head 212 to effect an exact correlation between the position of control shaft 235 and the spacing between the anticipating heads 212 and 212a. Specifically, the initial spacing between the anticipating heads is selected primarily to provide for desired control of the frequency reject filter within the range of movement of the rack 225. After the initial adjustment of the position of all three heads has been effected by the lead screw 222, 223, and 224, the movement of the record 211 past the anticipating heads causes the motor 229 to vary the position of the head 212 in the manner described above if signals of constant frequency appear on the trace 211a. In the event that no steady state signals appear on the trace 211a, the signals reproduced by the anticipating heads 212 and 212a are completely random and bear no particular phase relationship one to the other with the result that the phase discriminator 227 fails to develop a control signal and the motor 229 remains quiescent. If, however, steady state signals are present on the trace 211a the motor 229 moves the rack 225 until the signals applied to the phase discriminator 227 from heads 212 and 212a are in phase. As previously indicated, the latter condition occurs when the anticipating heads 212 and 212a are separated by one full wave lengths of the steady state signals if such a separation falls within the range of movement of the rack 225. Thus, for a 20 cycle steady state signal, which has a 50 millisecond cycle, the anticipating heads would be separated by such distance that a single point on the record 211 would traverse the space between the heads in exactly 50 milliseconds. For steady state signals of higher frequency the reproduction of in phase signals by the anticipating heads 212 and 212a may require a separation between heads of two or more complete wave lengths, due primarily to the physical limitations of the apparatus in prohibiting the anticipating heads from being moved excessively close together. In any event, only one position of the rack within its range of movement will cause steady state signals of a particular frequency to be in phase when reproduced by the anticipating heads 212 and 212a. When the rack 225 has been automatically moved to this one position by the motor 229, the motor is rendered inoperative and the control shaft 235 of the reject filter is set to reject the steady state signals when the latter are reproduced by the head 213a. Any change in the frequency of the steady state signal induces a corresponding change in the frequency characteristics of the reject filter, thereby automatically to eliminate all steady state signals irrespective of their frequency.

For the purpose of adjusting the reject filter to remove a band of frequencies in the unused portion of the spectrum in the absence of steady state signals on the record 211, the apparatus illustrated in FIG. 5 may include a manually operated switching means (not shown) connected in the circuits between the anticipating head 212a and amplifier 228 and between the anticipating head 212 and amplifier 226. With the switching means in its open circuit position the reject filter control 235 may be manually rotated until the band of frequencies rejected falls beyond the useful portion of seismic spectrum. As previously indicated, the signal channels 211b and 211c are also provided with equipment for automatically eliminating steady state signals appearing on these channels in the manner described.

While the apparatus shown in FIG. 5 has been described as being effective automatically to control a frequency reject filter in order to attenuate a particular band of frequencies, it is apparent that the apparatus could, if desired, be used to accentuate signals of constant frequency appearing on the record 211. Thus, the filter control 235 could be connected to a band pass filter in order to adjust the filter in response to signals of uniform frequency reproduced by the anticipating heads 212 and 212a and applied to the phase discriminator 227.

The system shown in FIG. 5 for separating steady state signals from the reproduced seismic signals requires a plurality of motors together with their associated mechanical couplings, gearings and electrical control circuits for effecting the desired results. Such a system has been shown and described since it provides an apt illustration of the principles involved even though considerably less complex equipment, as shown in FIG. 6, may be employed to effect the same results. It will be apparent that any disturbance occurring within the area under survey to create a steady state interference signal will cause signals of identical frequency to appear upon all of the signal traces of the record 211. With this fact in mind it will be appreciated that the frequency selective reject circuits associated with the reproducing heads for all of the traces are preferably adjusted to reject the same undesired frequency band. Recognition and use of this fact has facilitated the simplification of the equipment shown in FIG. 5 to that illustrated in FIG. 6.

The record 211 depicted in FIG. 6 is again shown as including any number of signal channels or traces 211a, 211b and 211c each having associated therewith a pair of spaced anticipating heads and a reproducing head. The anticipating heads associated with the trace 211a are designated 212 and 212a and the reproducing head is designated 213a, while the heads associated with the trace 211b are designated 212', 212b and 212c and the heads associated with the trace 211c are designated 212", 212c and 213c.

The reproducing head 213a is slidably mounted upon a supporting element 219a secured to reproducing apparatus 210' the movement of the reproducing head along this element being effected by means of a lead screw 223a threadedly engaging a flange 220a on the element. In similar manner, movement of the reproducing head 213b along an element 219b affixed to the reproducing apparatus is effected by a lead screw 223b in engagement with a flange 220b. Movement of the reproducing head 213c along an element 219c secured to the reproducing apparatus is effected by a lead screw 223c in threaded engagement with a flange 220c. The anticipating heads 212a, 212b and 212c are all mounted upon a unitary structure consisting of support member 217 and a plurality of legs 217a, 217b and 217c extending laterally of this member. The anticipating heads 212a, 212b and 212c are respectively mounted upon the legs 217a, 217b and 217c of this unitary structure. In order to provide for the selective movement in unison of the anticipating heads 212a, 212b and 212c back and forth in the direction of movement of the record 211, there is provided a lead screw 222 rotatably journalled within but carrying the support member 217 and having a threaded portion in engagement with a block 218 affixed to the reproducing apparatus 210'.

The anticipating heads 212, 212' and 212" are respectively carried upon spaced, parallel arms 216a, 216b and 216c of a supporting structure generally indicated as 216. This supporting structure is adapted to be moved as a body back and forth in the direction of movement of the record 211 within guide rails 214 and 215 affixed at spaced positions to the reproducing apparatus 210'. Each of these rails includes a guide channel or keyway, these being designated 214a and 215a, for accommodating spaced interlocking keys (not shown) on the supporting structure in order to direct the movement of this structure. The anticipating head 212 is slidably mounted upon the arm 216a and is moved back and forth upon this arm by means of a lead screw 224 in engagement with a flange 216d. In similar manner, the anticipating head 212' is moved back and forth upon the arm member 216b by means of a lead screw 226 in engagement with flange 216e and the anticipating head 212' is moved back and forth upon the arm member 216c by means of a lead screw 227 in engagement with flange 216f.

For the purpose of effecting the described movement of the supporting structure 216, one of the arm members, for example, the arm member 216a as shown in FIG. 6 functions as a rack gear. To this end, the upper surface of the arm member 216a is provided with teeth as indicated at 245, meshing with a drive gear 253 which is carried upon a shaft 252. This shaft is rotatably supported by the reproducing apparatus 210' at a fixed position in proximity to the arm member 216a. The shaft 252 is mechanically coupled, as indicated by the broken line 251, to shaft 246a of a motor 246 which is operated during certain intervals in a manner to be described in detail hereinafter. For a purpose which will soon become apparent, the shaft 252, as indicated by the broken lines 254, is also mechanically coupled to control shafts 255, 259 and 260 of the reject filter circuits respectively embodied in amplifiers 256, 257 and 258. The amplifiers 256, 257 and 258 are provided at the outputs of reproducing heads 213a, 213b and 213c, respectively, and function in conventional manner to provide signals for application to the recording apparatus as previously described.

Amplifiers 240, 241 and 242 receive the output signals from the anticipating heads 212a, 212b and 212c, respectively, and provide a plurality of signals for application to the spaced sets of signal input terminals of the mixer 243. This mixer adds the three input signals thus applied in order to provide a signal for energizing one set of signal input terminals of phase discriminator 244. The signals reproduced by the anticipating heads 212, 212', 212" are respectively applied to the input terminals of amplifiers 247, 248 and 249 for passage to mixer 250. The mixer 250 adds the three input signals applied thereto and provides a composite signal for application to the second set of input terminals of the phase discriminator 244. The phase discriminator, when excited by input signals of identical frequency but different phase, develops a control signal which, after passing through amplifier 245, actuates the motor 246. In the absence of steady state signals upon the signal traces 211a, 211b and 211c the input signals to the phase discriminator 244 are of different frequency and bear no particular phase relationship one to the other with the result that the motor 246 is not energized. If, however, the traces 211a, 211b and 211c include undesired steady state signals, the signals from the mixers 243 and 250 are identical in frequency but may be displaced in phase. If so, the phase discriminator 244 develops a unidirectional control signal which induces the motor 246 to rotate the shaft 246a. Rotation of the shaft 246a drives the gear 253 and moves the supporting structure 216 either to the right or left as viewed in FIG. 6 in order to increase or decrease the spacing between the two anticipating heads associated with each signal trace. When the two anticipating heads associated with each trace are separated by a distance equal to one full wave length of the steady state signal or to an integral number of such wave lengths, the signals applied to the phase discriminator 244 from the mixers 243 and 250 are in phase with the result that motor 246 is de-energized. The rotation of the shaft 252 by the motor 246 in the manner indicated above induces a corresponding rotation of the control shafts 255, 259 and 260 for the reject filter circuits in the amplifiers 256, 257 and 258 and, as a result, these reject filters are simultaneously adjusted to reject all signals having a frequency corresponding to the spacing between the pairs of anticipating heads associated with each of the signal traces.

From the foregoing explanation, it will be observed that, in the operation of the equipment shown in FIG. 6, the lead screws 222, 223a, 223b, 223c, 224, 226 and 227 are initially adjusted to provide the desired spacing between the reproducing head and the pair of anticipating heads associated with each of the signal traces. When the positions of all of the anticipating heads and all of the reproducing heads have been established in the manner previously described, the pair of anticipating heads associated with each signal trace provides signals for exciting the phase discriminator 244. In the event that steady state signals are present, the anticipating heads 212, 212' and 212'' are moved in unison in the manner described above until the signals applied to the phase of discriminator from the mixers 243 and 250 are in phase coincidence. At the same time, reject filter circuits of the amplifiers 256, 257 and 258 are automatically adjusted to eliminate all signals having a frequency corresponding to the steady state signals with the result that the signals passed by the amplifiers 256, 257 and 258 to the recording apparatus do not contain the undesired steady state signal interference.

It will be understood that the apparatus shown in FIG. 6 may be provided with a manually operated switching means in the output connectors of all of the anticipating heads for rendering the apparatus ineffective to rotate the reject filter controls in the absence of steady state signals. As previously mentioned, when this switching means is effective to break the circuits from the anticipating heads the reject filter controls may be manually adjusted to reject a band of frequencies falling outside of the seismic spectrum. Also, it should be recognized that the apparatus illustrated in FIG. 6 may be employed to adjust band pass filters for accentuating a particular band of constant frequency signals appearing on the record 211.

An alternative embodiment of the invention for eliminating the undesired steady state signals is illustrated in FIG. 7, wherein there is disclosed apparatus differing from that shown in FIG. 6 principally by the elimination of a considerable amount of the equipment used in the latter. This desirable result is achieved primarily by employing the reproducing head to perform both the function of reproducing signals for application to the recorder as well as the function previously accomplished by one of the air of anticipating heads associated with each trace in the apparatus illustrated in FIG. 6. Specifically, the invention is illustrated in FIG. 7 as embodied in a reproducing apparatus 310 for reproducing signals appearing as a plurality of spaced signal channels 311a, 311b and 311c upon a record 311. An anticipating head 312a and a reproducing head 313a is associated with each of these signal channels although in FIG. 7 only one such anticipating head and reproducing head are illustrated. The reproducing head 312a is slidably mounted upon a bar 314 having a toothed portion, as indicated at 315, which functions as a rack gear for a purpose which will become evident from the ensuing descriptions. The bar 314 is adapted to be moved longitudinally of the reproducing apparatus 310 upon suitable fixed structure 316 by means of a drive gear 317 meshing with the toothed portion 315. The drive gear 317 is mounted upon a shaft 318 rotatably supported in fixed position on the reproducing apparatus 310. In order to provide for the adjustment of the position of the anticipating head 312a along the bar 314 there is provided a lead screw 319 in threaded engagement with a flange 314a. In like manner, the reproducing head 313a is moved back and forth along an element 320 affixed to the reproducing apparatus by means of a lead screw 321 in engagement with a flange 320a. The signals reproduced by the reproducing head 313a are simultaneously applied to the signal input terminals of two amplifiers 322 and 323. The amplifier 322 includes a band reject filter the frequency selection characteristics of which may be altered by turning a filter control shaft 324. As previously indicated, the purpose of the reject filter of the amplifier 322 is to eliminate the undesired steady state signals reproduced by the reproducing head 313a and to pass only the desired seismic signals from the amplifier 322 to the recording apparatus. The output signals from the amplifier 323 are applied to one set of signal input terminals of a phase discriminator 325. The signals reproduced by the anticipating head 312a are applied through amplifier 326 to the second set of signal input terminals of the phase discriminator. The phase discriminator 325 functions in the manner described above to develop a control signal which, when passed through amplifier 327, controls a motor 328. Shaft 328a of the motor 328 is mechanically connected, as indicated by the broken line 329 to the shaft 318 mounting the drive gear 317. As indicated by the broken line 330, the motor shaft 328a is also connected to the control shaft 324 of the reject filter.

In the absence of steady state signals on the signal traces 311a, 311b and 311c of the record 311 the phase discriminator 325 fails to develop a control signal for the reasons previously explained. When, however, steady state signals are present upon the signal traces the signals developed by the reproducing head 313a and by the anticipating head 312a have a definite phase relationship which is a function of the spacing between these heads. The phase discriminator 325 develops a control signal having a magnitude corresponding to the difference in phase between the two signals applied to sets of input terminals and applies the control signal to the motor 328. As a result the motor is energised and the bar 314 is moved to alter the spacing between the anticipating head 312a and the reproducing head 313a until the two input signals to the phase discriminator 325 are in phase coincidence. Obviously, phase coincidence between these signals occurs when the heads 312a and 313a are separated by either one full wave length of the steady state signal or by an integral number of such wave lengths. As the bar 314 is moved to a position wherein the signals applied to the phase discriminator 325 are in phase, the control shaft 324 of the reject filter for the amplifier 322 is automatically tuned to reject all signals having a frequency corresponding to the spacing between the heads 312a and 313a.

The sources of the steady state signals creating interference at each of the detectors are usually of the type which produce sustained vibrations for a relatively long period of time. Hence, it is likely that the steady state signals will appear at all of the detectors in the array for the duration of any particular reflection shooting period. Thus, steady state signals of identical frequency are recorded on each trace of the phonographically reproducible record and these signals generally persist at constant frequency for the entire traces. If such is the case, proper tuning of the reject filter of the amplifier 322 will eliminate all of the steady state signals without further adjustment during the playback of the record 311 but, in the event that the frequency of the steady state signals changes during the shooting period, their elimination will still be effected by automatic tuning of the filter in the manner described above. In the operation of the apparatus shown in FIG. 7, the record 311 moves at approximately constant speed in the direction indicated by the arrow 332 in order to pass the signal trace 311a first beneath the anticipating head 312a and then beneath the reproducing head 313a. Obviously, the signals will be reproduced by the anticipating head prior to their reproduction by the head 313a and, for this reason, until the leading edge of the signal trace 311a has reached a position beneath the reproducing head, the apparatus is incapable of controlling the control shaft 324 for the reject filter. As soon as the record 311 has been moved a sufficient distance to induce reproduction of signals from both of the heads, the automatic control of the reject filter is effected in the manner previously described.

Although it is contemplated that a separate motor and control circuit will be provided for the anticipating head and reproducing head associated with each of the signal traces for the apparatus illustrated in FIG. 7, it will be apparent that, if desired, the anticipating heads for all of the traces could be mounted on a single supporting structure as shown in FIG. 6. The steady state signals could then be eliminated from the signals reproduced from all of the traces, by moving the anticipating heads in unison as described in conjunction with the embodiment of the invention illustrated in FIG. 6 with the result that only a single motor and control circuit would be required.

Moreover, the apparatus shown in FIG. 7 may be provided with manually operable means for adjusting the reject filter to eliminate a band of frequencies outside of the seismic spectrum in the absence of steady state signals on the record 311. Also, as previously indicated, the apparatus shown in FIG. 7 may be employed automatically to adjust frequency selective band pass filters in response to the reproduction of constant frequency signals from the record.

From the foregoing explanation it will be apparent that the reproducing apparatus of the present invention provides a practical solution to many of the problems normally encountered in the reproduction, translation and analysis of signals recorded upon a phonographically reproducible record. In particular, the apparatus of the present invention provides for the automatic control of signals reproduced from a phonographically reproducible record in order to emphasize reflected seismic wave signals and to attenuate undesired responses by employing at least two reproducing heads spaced in the direction of record travel from which automatic correlation information is obtained and utilized. Furthermore, the present improved reproducing apparatus provides for the reproduction of signals recorded as a plurality of signal channels upon a suitable record from which cross correlation information between the spaced channels is obtained and employed automatically to adjust the reproducing apparatus.

While particular embodiments of the invention have been shown and described, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent by the United States is:

1. Apparatus for reproducing seismic signals recorded on a phonographically reproducible record including a plurality of signal traces each containing reflection energy and random noise, which apparatus comprises a pair of spaced reproducing means for each of said traces, means for causing the reproducing means of each pair to reproduce at different times the same signals from its associated trace, whereby a first of the reproducing means of each pair reproduces the signals prior to the reproduction of the same signals by a second reproducing means of that pair, a variable device responsive to the signals reproduced by the second reproducing means of each pair, and means jointly responsive to the signals reproduced by the first reproducing means of each pair for developing a control signal which varies in amplitude as a function of the algebraic sum of the signals from the first reproducing means of each pair, whereby said control signal is peaked when the signals from the first reproducing means of each pair corresponding to the reflection energy are in phase, and means responsive to said control signal for altering the signal transmission characteristics of the variable device when the same signals are reproduced by the second reproducing means of each pair.

2. Apparatus for reproducing the seismic signals recorded on the phonographically reproducible record including a plurality of signal traces each containing reflection energy and random noise, which apparatus comprises a pair of spaced reproducing means associated with each of said traces, means for moving the record past the pairs of reproducing means so that both of the reproducing means of each pair reproduce at different times the signals of its associated trace, means for amplifying the signals reproduced by one of the reproducing means of each pair, and means jointly responsive to the signals reproduced by the other reproducing means of each pair for developing a control signal which varies in amplitude as a function of the combined amplitudes of the signals from the other reproducing means of each pair, whereby said control signal is peaked when the signals from the other reproducing means of all of the pairs corresponding to the reflection energy are in phase, and means responsive to said control signal for controlling the signal transmission characteristics of said amplifying means.

3. Apparatus for reproducing seismic signals recorded on a phonographically reproducible record including a plurality of signal traces each containing reflection energy and random noise, which apparatus comprises a pair of spaced reproducing means associated with each of said traces, means for moving the record past the reproducing means of each pair in sequence so that both of the reproducing means of each pair reproduce at different times identical signals from the associated trace, means for amplifying the signals reproduced by at least one of the reproducing means of each pair, time delay means for delaying the signals reproduced by the other reproducing means of each pair for an interval of time which is a function of the time difference between the reproduction of identical signals by the reproducing means of each pair, and means jointly responsive to the delayed signals from said time delay means for developing a control signal which varies in amplitude as a function of the combined amplitudes of the signals from the other reproducing means of each pair, whereby said control signal is peaked when the signals from the other reproducing means of all of the pairs corresponding to the reflection energy are in phase, and means responsive to said control signal for controlling the gain of all of the amplifying means.

4. Apparatus for reproducing and translating seismic signals recorded on a phonographically reproducible record including a plurality of signal traces each containing reflection energy and random noise, comprising a pair of spaced reproducing means associated with each of said traces, means for inducing both of the reproducing means of each pair to reproduce at different times the signals of the associated trace with a first reproducing means of each pair being effective to reproduce its signals prior to the reproduction of the same signals by a second reproducing means of each pair, means for adjusting the spacing between the reproducing means of each pair in order to control the time difference between the reproduction of identical signals by the reproducing means of each pair, amplifying means for the signals reproduced by the second reproducing means of each pair, and means jointly responsive to the signals reproduced by the first reproducing means of each pair for developing a control signal which varies in amplitude as a function of the algebraic sum of the signals from the first reproducing means of each pair, whereby said control signal is peaked when the signals from the first reproducing means of each pair corresponding to the reflection energy are in phase, and means responsive to said control signal for altering the gain of the amplifying means when the same signals are reproduced by the second reproducing means of each pair.

5. Apparatus for reproducing and translating seismic signals recorded on a phonographically reproducible record, which seismic signals comprise energy from a source of seismic waves as reflected to a receiving position from one or more subsurface strata together with random noises and other spurious signals, said apparatus comprising at least two spaced reproducing means for reproducing identical ones of said signals at different times, whereby a first of said reproducing means reproduces said signals prior to the reproduction of the same signals by the second reproducing means, means for translating the signals reproduced by the second of said reproducing means into visible manifestations, and means responsive to the identical signals reproduced by the first of said reproducing means for accentuating the visible manifestations corresponding to the reflected wave energy reproduced from said record in order to distinguish the same from the random noises and other spurious signals.

6. Apparatus for reproducing and translating the seismic signals recorded on a phonographically reproducible record, which seismic signals comprise energy from a source of seismic waves reflected to a receiving point from one or more subsurface strata together with random noises and other spurious signals, said apparatus comprising at least two spaced reproducing means for reproducing identical ones of said signals at different times, means responsive to the signals reproduced by one of said reproducing means for altering the amplitude of the identical signals when reproduced by the other of said reproducing means, means for translating the altered signals into visible manifestations, and means responsive to the signals reproduced by the other reproducing means for accentuating those visible manifestations corresponding to the reflected wave energy reproduced from said record in order to distinguish the same from the random noises and other spurious signals.

7. Apparatus for reproducing and translating seismic signals recorded as at least one signal trace on a phonographically reproducible record, which seismic signals comprise energy from a source of seismic waves reflected to a receiving position from one or more subsurface strata together with random noises and other spurious signals, said apparatus comprising first reproducing means for reproducing the signals recorded on said record in order to convert the same into electrical energy, means for translating said electrical energy into visible manifestations, said translating means including a deflection device responsive to the signals reproduced from said record in order to produce a visible trace corresponding to the signal trace appearing on said record, said visible trace including portions corresponding to the reflected wave energy as well as to random noises and other spurious signals, second reproducing means for reproducing the signals recorded on said record prior to their reproduction by said first reproducing means in order to develop control signals, and means responsive to said control signals for increasing the intensity of those portions of said visible trace corresponding to the deflections produced by the reflected wave energy.

8. Apparatus for reproducing and translating seismic signals recorded as at least one signal trace on a phonographically reproducible record, which seismic signals comprise energy from a source of seismic waves reflected to a receiving position from one or more subsurface strata together with random noises and other spurious signals, said apparatus comprising means for reproducing the signals recorded on said record in order to convert the same into electrical energy, means for translating said electrical energy into visible manifestations in order to produce a visible trace corresponding to the signal trace appearing on said record and including portions corresponding to the reflected wave energy as well as to the random noises and other spurious responses, second reproducing means for reproducing the signals recorded on said record prior to their reproduction by said first reproducing means in order to develop control signals, and means responsive to said control signals for increasing the intensity of those portions of said visible trace corresponding to the reflected wave energy.

9. Apparatus for reproducing and translating seismic signals recorded as a plurality of signal traces on one or more phonographically reproducible records, which seismic signals comprise energy received at a detecting position as reflected from one or more subsurface strata together with random noises and other spurious responses, said apparatus comprising a first set of reproducing means for reproducing the signals appearing on said traces, means jointly responsive to the signals reproduced from all of said traces for producing control signals, second reproducing means for reproducing the signal of at least one of said signal traces to develop electrical energy, means for translating the electrical energy into visible manifestations including a visible trace corresponding to said one trace and including portions corresponding to the reflected wave energy, and means responsive to said control signals for accentuating the visible trace at time positions corresponding to the reflected wave energy, whereby the reflected wave energy on said visible trace is distinguishable from the remainder of the visible trace.

10. Apparatus for reproducing and translating seismic signals recorded as a plurality of signal traces on one or more phonographically reproductible records which seismic signals comprise energy from a source of seismic waves received at a detecting position as reflected from one or more subsurface strata together with random noises and other spurious responses, said apparatus comprising a pair of spaced reproducing means associated with each of said signal traces for reproducing the signals appearing on said record, at different times so that a first of the reproducing means of each pair reproduces the signals from its associated trace prior to the reproduction of the same signals by the second reproducing means of that pair, means jointly responsive to the signals reproduced by the first reproducing means of each pair for producing control signals, means for translating the signals reproduced by the second reproducing means of each pair into visible manifestations, said translating means including a deflection device for producing a plurality of visible traces each corresponding to one of said signal traces and each including portions corresponding to the reflected wave energy, means responsive to said control signals for controlling said deflection device in order to increase the deflection of the visible traces at time positions corresponding to the reflected wave energy, and means responsive to said control signals for increasing the intensity of the visible traces at time positions corresponding to the reflected wave energy.

11. Apparatus for reproducing and translating seismic signals recorded as a plurality of signal traces on one or more phonographically reproducible records, which seismic signals comprise energy from a source of seismic waves received at a detecting position as reflected from one or more subsurface strata together with random noises and other spurious responses, said apparatus comprising a pair of spaced reproducing means associated with each of said signal traces for reproducing the signals appearing on said record at different times so that a first of the reproducing means of each pair reproduces the signals from its associated trace prior to the reproduction of the same signals by the second reproducing means of that pair, means jointly responsive to the signals reproduced by the first reproducing means of each pair for producing control signals, means for translating the signals reproduced by the second reproducing means of each pair into visible manifestations including a plurality of visible traces each corresponding to one of said signal traces and each including portions corresponding to the reflected wave energy, and means responsive to said control signal for increasing the intensity of the visible traces at time positions corresponding to the reflected wave energy.

12. Apparatus for reproducing and translating seismic signals recorded as at least one signal trace on a phonographically reproducible record, which seismic signals comprise energy from a source of seismic waves reflected to a receiving position from one or more subsurface strata together with random noises and other spurious signals, said apparatus comprising a pair of spaced reproducing means associated with said signal trace for converting the signals on said record into electrical energy, means for translating the electrical energy produced by a first of said reproducing means into visible manifestations including a visible trace corresponding to the signal trace appearing on said record and including portions corresponding to the reflected wave energy, and means responsive to the signals produced by a second of said reproducing means for increasing the intensity of those portions of the visible trace corresponding to the reflected wave energy.

13. Apparatus for reproducing and translating seismic signals recorded as at least one signal trace on a phonographically reproducible record, which seismic signals comprise energy from a source of seismic waves reflected to a receiving position from one or more subsurface strata together with random noises and other spurious responses, said apparatus comprising a pair of spaced reproducing means associated with said signal trace for converting the signals on said record into electrical energy, means for translating the electrical energy produced by a first of said reproducing means into visible manifestations, said translating means including a recording device responsive to the electrical energy produced by said second reproducing means for producing a visible trace corresponding to the trace appearing on said record and including portions corresponding to the reflected wave energy, time delay means for delaying the signals reproduced by the first of said reproducing means for a time interval which is a function of the spacing between said first and second reproducing means, and means responsive to the delayed signals for accentuating those portions of the visible trace corresponding to the reflected wave energy.

14. Apparatus for reproducing and translating seismic signals recorded as a plurality of signal traces on one or more phonographically reproducible records, which seismic signals comprise energy received at a detecting position as reflected from one or more subsurface strata together with random noises and other spurious responses, said apparatus comprising a pair of spaced reproducing means associated with each of said signal traces for reproducing the signals appearing on said record at different times, whereby the first reproducing means of each pair reproduces the signals from its associated trace prior to the reproduction of the same signals by the second reproducing means of that pair, means jointly responsive to the signals reproduced by the first reproducing means of each pair for developing control signals, means for translating the signals reproduced by the second reproducing means of each pair into visible manifestations, said translating means including a deflection device responsive to the signals reproduced from said record in order to produce a visible trace corresponding to the signal trace appearing on said record and including the reflected wave energy as well as the random noises and other spurious responses, means responsive to said control signals for controlling said deflection device in order to increase the deflection of the visible traces at time positions corresponding to the reflected wave energy, time delay means for rendering the means controlling said deflection device ineffective for an interval of time which is a function of the spacing between the reproducing means of each pair, and means responsive to said control signals at the expiration of said time interval for increasing the intensity of the visible traces at time positions corresponding to the reflected wave energy.

15. Apparatus for reproducing and translating seismic signals recorded as at least one signal trace on a phonographically reproducible record, which seismic signals comprise energy reflected from a source of seismic waves to a receiving position from one or more subsurface strata together with random noises and other spurious signals, said apparatus comprising a pair of spaced reproducing means associated with said signal trace for reproducing the signals on said record at different times, means for adjusting the spacing between said pair of reproducing means in order to control the time period between the reproduction of identical signals, means for translating the signals reproduced by a first of said reproducing means into visible manifestations, said translating means including a deflection device responsive to the signals reproduced by said first reproducing means for producing a visible trace corresponding to the trace appearing on said record and including portions corresponding to the reflected wave energy, time delay means for delaying the signals reproduced by a second of said reproducing means for a time interval which is a function of the spacing between the pair of reproducing means, and means responsive to the delayed signals for increasing the intensity of those portions of the visible trace corresponding to the reflected wave energy.

16. Apparatus for reproducing and translating seismic signals recorded as a plurality of signal traces on one or more phonographically reproducible records, which seismic signals comprise energy from a source of seismic waves received at a detecting position as reflected from one or more subsurface strata together with random noises and other spurious responses, said apparatus comprising a pair of spaced reproducing means associated with each of said signal traces for reproducing the signals appearing on said record at different times, whereby the first reproducing means of each pair reproduces the signals from its associated trace prior to the reproduction of the same signals by the second reproducing means of that pair, means for adjusting the spacing between each pair of reproducing means in order to control the interval between the reproduction of identical signals by the reproducing means of each pair, means jointly responsive to the signals reproduced by the first reproducing means of each pair for developing control signals, means for translating the signals reproduced by the second reproducing means of each pair into visible manifestations, said translating means including a deflection device for producing a plurality of visible traces each corresponding to one of said signal traces and each including portions corresponding to the reflected wave energy, means responsive to said control signals for controlling said deflection device in order to increase the deflection of the visible traces at time positions corresponding to the reflected wave energy, means responsive to said control signal for increasing the intensity of the visible traces at time positions corresponding to the reflected wave energy, and means for delaying the application of said control signals to the means controlling the deflection device and to the intensity control means for an interval of time which is correlated with the spacing between the reproducing means of each pair.

17. Apparatus for reproducing seismic signals recorded as a plurality of signal traces on a phonographically reproducible record comprising first and second spaced apart reproducing means associated with each of said traces for reproducing the signals from their associated trace at different times, a variable signal transmission device responsive to the signals reproduced by the second reproducing means associated with at least one of said traces, means jointly responsive to the signals reproduced by the first reproducing means of all of said traces for developing a control signal varying as a function of the phase relationship between the signals reproduced by the first reproducing means of all of the traces, and means responsive to said control signal for altering the signal transmission characteristics of said variable device.

18. The apparatus defined by claim 17 wherein the control signal is a direct current signal of varying amplitude.

19. The apparatus defined by claim 17 wherein means are provided for delaying the application of said control signal to the altering means for a period which is a function of the spacing between the first and second reproducing means associated with said one trace.

20. The apparatus defined by claim 17 wherein means are provided for adjusting the spacing between first and second reproducing means associated with said one trace.

21. Apparatus for reproducing seismic signals recorded on a magnetic record comprising first and second spaced apart magnetic reproducing heads for reproducing identical signals from said record at different times, means jointly responsive to the signals reproduced by the first reproducing head associated with each of said traces for developing a control signal varying as a function of the phase relationship between the signals reproduced by the first reproducing means of all of the traces, and means responsive to said control signal for altering at least one characteristic of the signals reproduced by the second reproducing head associated with one of said traces.

22. The apparatus defined by claim 21 wherein means are provided for delaying the application of said control signal to the altering means for a time interval which is a function of the spacing between the first and second reproducing heads associated with said one trace.

23. The apparatus defined by claim 21 wherein means are provided for adjusting the spacing between the first and second reproducing heads associated with said one trace.

24. The apparatus defined by claim 22 wherein the control signal developed is a direct current signal of varying amplitude.

25. Apparatus for reproducing seismic signals recorded as a plurality of traces on a phonographically reproducible record comprising first and second spaced apart reproducing means associated with each trace for reproducing the signals of their associated trace at different times, a plurality of variable signal transmission devices respectively responsive to the signals reproduced by the second reproducing means of each trace, means jointly responsive to the signals reproduced by the first reproducing means of all of said traces for developing a control signal varying as a function of the phase relationship between the signals reproduced by the first reproducing means of all of the traces, and means responsive to said control signal for altering the signal transmission characteristics of each of said variable devices.

26. The apparatus defined by claim 25 wherein the control signal developed is a direct current signal having an amplitude which varies in response to the phase relationship between the signals reproduced by the first reproducing means of all of the traces.

27. The apparatus defined by claim 25 wherein means are provided for altering the spacing between the first and second reproducing means of each trace.

28. The apparatus defined by claim 25 wherein means are provided for delaying the application of the control signal to the altering means for a predetermined time interval.

29. Apparatus for reproducing and translating seismic signals recorded on a phonographically reproducible record including a plurality of signal traces each containing reflection energy and random noise, comprising a pair of spaced reproducing means associated with each of said traces, means for inducing both of the reproducing means of each pair to reproduce at different times the signals of the associated trace with a first reproducing means of each pair being effective to reproduce its signals prior to the reproduction of the same signals by a second reproducing means of each pair, means for adjusting the spacing between the reproducing means of each pair in order to control the time difference between the reproduction of identical signals by the reproducing means of each pair, means jointly responsive to the signals reproduced by the first reproducing means of each pair for developing a control signal varying in amplitude as a function of the algebraic sum of the signals from the first reproducing means of each pair, whereby said control signal is peaked when all of the signals from the first reproducing means of each pair are in phase and correspond to the reflection energy on the seismic traces, means for amplifying the signals reproduced by the second reproducing means of at least one of said pairs, gain control means responsive to said control signal for controlling the gain of said amplifying means, and time delay means for preventing the application of said control signal to said gain control means for a predetermined time interval the length of which is correlated with the time difference between the reproduction of identical signals by the reproducing means of each pair.

References Cited in the file of this patent

UNITED STATES PATENTS

| | | |
|---|---|---|
| 2,077,466 | Dreyer | Apr. 20, 1937 |
| 2,079,959 | Fear | May 11, 1937 |
| 2,243,729 | Ellis | May 27, 1941 |
| 2,440,971 | Palmer | May 4, 1948 |
| 2,446,479 | Begun | Aug. 3, 1948 |
| 2,448,299 | Dorne | Aug. 31, 1948 |
| 2,493,534 | Hawkins | Jan. 3, 1950 |
| 2,580,934 | Love | Jan. 1, 1952 |
| 2,629,861 | Begun | Feb. 24, 1953 |
| 2,672,944 | Minton | Mar. 23, 1954 |
| 2,702,380 | Brustman | Feb. 15, 1955 |
| 2,721,990 | McNaney | Oct. 25, 1955 |
| 2,794,965 | Yost | June 4, 1957 |
| 2,808,465 | Ham | Oct. 1, 1957 |
| 2,870,430 | Hancock | Jan. 20, 1959 |